(12) United States Patent (10) Patent No.: US 8,370,328 B2
Woytowitz et al. (45) Date of Patent: Feb. 5, 2013

(54) SYSTEM AND METHOD FOR CREATING AND MAINTAINING A DATABASE OF DISAMBIGUATED ENTITY MENTIONS AND RELATIONS FROM A CORPUS OF ELECTRONIC DOCUMENTS

(75) Inventors: Michael A. Woytowitz, Freeland, MD (US); Marshall Wells Hawks, Upperco, MD (US)

(73) Assignee: Comsort, Inc., Hunt Valley, MD (US)

( * ) Notice: Subject to any disclaimer, the term of this patent is extended or adjusted under 35 U.S.C. 154(b) by 57 days.

(21) Appl. No.: 13/206,492

(22) Filed: Aug. 9, 2011

(65) Prior Publication Data

US 2012/0197862 A1 Aug. 2, 2012

Related U.S. Application Data

(60) Provisional application No. 61/438,222, filed on Jan. 31, 2011, provisional application No. 61/487,897, filed on May 19, 2011.

(51) Int. Cl.
*G06F 7/00* (2006.01)
(52) U.S. Cl. ........................................................ 707/719
(58) Field of Classification Search .................. 707/719, 707/748
See application file for complete search history.

(56) References Cited

U.S. PATENT DOCUMENTS

| | | | |
|---|---|---|---|
| 7,512,628 | B2 | 3/2009 | Chess et al. |
| 7,672,833 | B2 | 3/2010 | Blume et al. |
| 7,685,201 | B2 | 3/2010 | Zeng et al. |
| 2008/0005651 | A1 | 1/2008 | Grefenstette et al. |
| 2010/0131507 | A1 | 5/2010 | Pradhan et al. |
| 2010/0145940 | A1 | 6/2010 | Chen et al. |
| 2010/0145956 | A1 | 6/2010 | Shi et al. |
| 2010/0145958 | A1* | 6/2010 | Duffy et al. .................. 707/755 |
| 2010/0198841 | A1 | 8/2010 | Parker et al. |

OTHER PUBLICATIONS

The International Search Report and Written Opinion of the International Searching Bureau, mailed on Jan. 5, 2012, cited in related International patent application No. PCT/US11/47311, filed Aug. 10, 2011.
Bhattacharya, I. et al., A Latent Dirichlet Model for Unsupervised Entity Resolution, 6th SIAM International Conference on Data Mining (2006).
Bhattacharya, I. et al., Relational Clustering for Entity Resolution Queries, ICML Workshop on Open Problems in Statistical Relational Learning (2006).
Malin, B. et al., A Network Analysis Model for Disambiguation of Names in Lists, Computational & Mathematical Organization Theory, 11, 119-139 (2005).
Kalashnikov, D. V. et al., A probabilistic model for entity disambiguation using relationships, RR-Rescue-04-12.1-22 (Jun. 1, 2004).

(Continued)

*Primary Examiner* — Truong Vo
(74) *Attorney, Agent, or Firm* — Law Offices of Grady L. White, LLC

(57) ABSTRACT

Method and apparatus for creating an electronic database of disambiguated entity mentions and relations from a corpus of electronic documents. The invention automatically extracts from the corpus of electronic documents mentions about entities (e.g., references to people, organizations or places), parses the entity mentions into "mention objects," and executes a series of grouping, comparison and hierarchical fuzzy object clustering algorithms to cluster together in an electronic database all of the mention objects referring to the same entity and all of the mention objects (e.g. "people") associated with each other by a relationship (e.g., "co-authors" or "family members"). The resulting electronic database of disambiguated entity mentions and relations, which may comprise, for example, an XML document, a relational database or hierarchical database, is structured to permit useful recordation, access, review and display of all of the mentions and relations associated with a particular entity or collection of entities.

52 Claims, 9 Drawing Sheets

OTHER PUBLICATIONS

Pilz, A., Entity Disambiguation usnig Link based Relations extracted from Wikipedia, Proceedings of the 26th International Conference on Machine Learning, Haifa, Israel (2010).

Kalmar, P. et al., Features for Web Person Disambiguation, Kalmar Research and Consulting in Natural Language Processing and Computing (2009).

Berzal, F. et al., Enabling Fuzzy Object Comparison in Modern Programming Platforms through Reflection, IFSA 2003, LNAI 2715, pp. 660-667, Springer-Verlag, Berlin Heidelberg (2003).

Hallez, A. et al., Performance Optimization of Object Comparison, International Journal of Intelligent Systems (2009), vol. 24, 1057-1076. Wiley InterScience, published online at www.interscience.wiley.com.

Bagga, A. et al., Entity-Based Cross-Document Coreferencing Using the Vector Space Model, Proceeding COLING '98 Proceedings of the 17th international conference on Computational linguistics, vol. 1, Association for Computational Linguistics, Stroudsburg, PA(1998).

Elmacioglu, E. et al., PSNUS: Web People Name Disambiguation by Simple Clustering with Rich Features, Proceedings of the 4th International Workshop on Semanic Evaluations (SemEval-2007), 268-271, Association for Computational Linguistics, Prague (2007).

Marin, N. et al., Complex object comparison in a fuzzy context, Information and Software Technology 45 (2003) 431-444.

Mann, G. S. et al., Unsupervised Personal Name Disambiguation, Proceeding CONLL '03 Proceedings of the seventh conference on Natural language learning at HLT-NAACL 2003, Association for Computational Linguistics, Stroudsburg, PA (2003).

"Cluster Analysis—Wikipedia, the Free Encylopedia," (URL: http://en.wikipedia.org/siki/Cluster_analysis#Hierarchical_clustering) (Date Unknown).

"Fuzzy Logic—Wikipedia, the Free Encylopedia," (URL: http://en.wilipedia.org/wiki/Fuzzy_logic) (Date Unknown).

* cited by examiner

ENTITY MENTION HARVESTING

ENTITY MENTIONS                MENTION AND RELATION
                                      OBJECTS

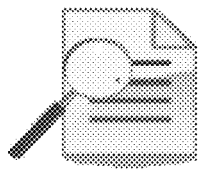 In corporate news this
month, John Smith was
promoted to regional             Person: John Smith
vice president of sales          Organization: Acme Inc
for Acme Inc.                    Role: Vice President of
                                 Sales

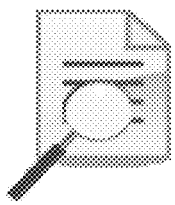 UCLA alumni, John
Smith (Class of 86) is a         Person: John Smith
sales manager living in          Location: Los Altos
Los Altos CA.                    CA.
                                 Organization: UCLA
                                 Role: Alumni

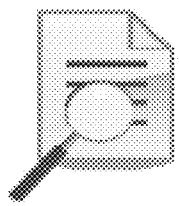 UCLA School of Engineering
Class of 1999:
....                             Person: JM Smith
....                             Organization: UCLA
Smith JM, B.S. Industrial        Role: Alumni
Engineering
....

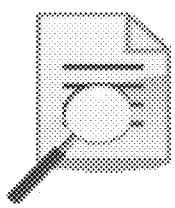 <Customer>
  <Company>Cogs Inc.</
Company>                         Person: John Smith
  <Contact>Smith, John</        Organization: Cogs Inc.
Contact>
</Customer>

FIG. 5

PERSON MENTION OBJECTS - BEFORE
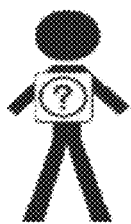
Person: John Smith
Organization: Acme Inc
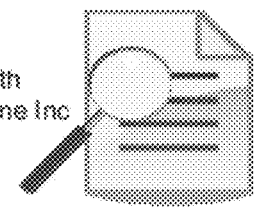
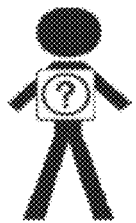
Person: John Smith
Organization: UCLA
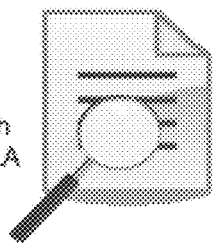
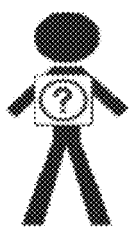
Person: J M Smith
Organization: UCLA
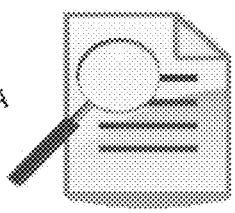
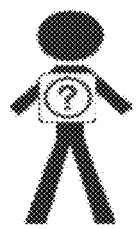
Person: John Smith
Organization: Cogs Inc
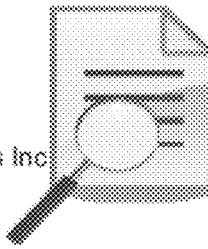
FIG. 6

PERSON MENTION OBJECTS – AFTER
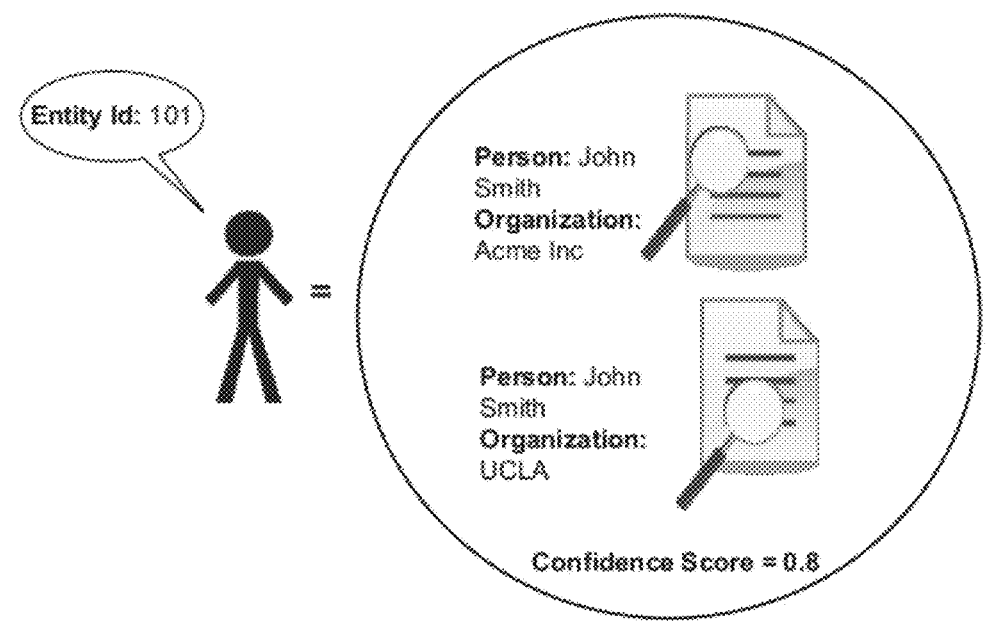
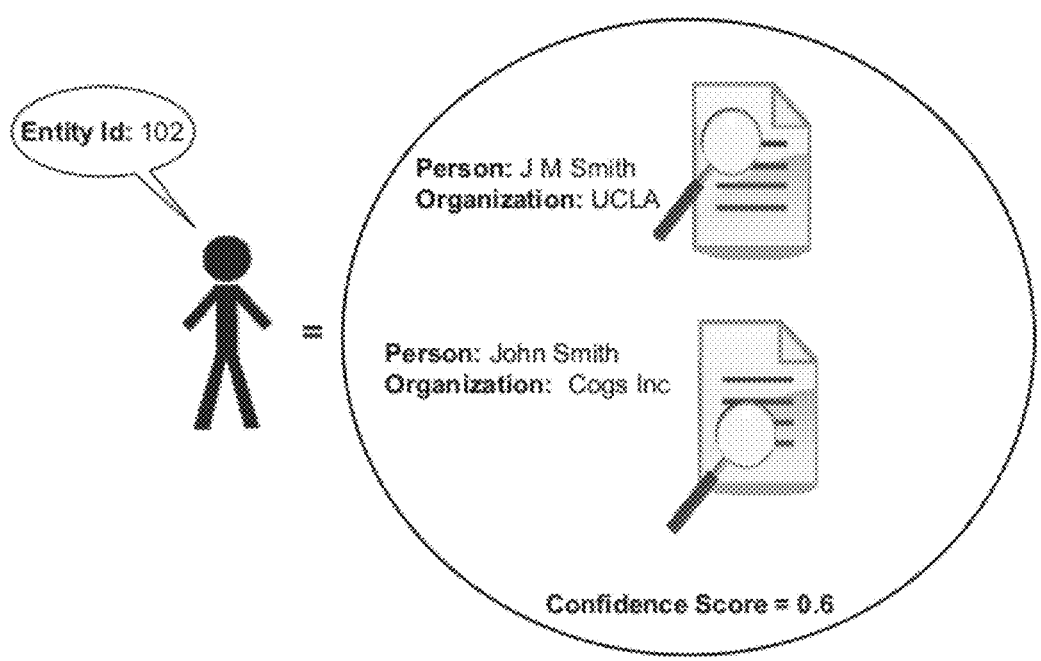
FIG. 7

ORGANIZATION MENTION OBJECTS - BEFORE
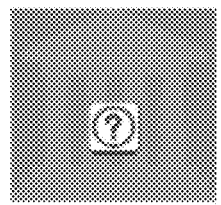
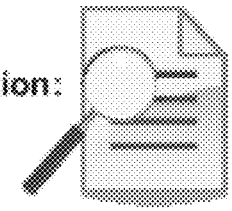
Organization:
UCLA
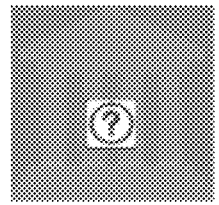
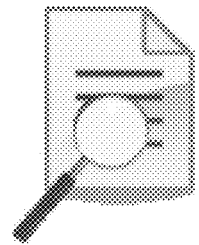
Organization:
UCLA
School of
Engineering
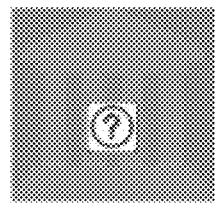
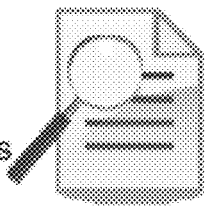
Organization:
University of
California at Los
Angeles
FIG. 8

SYSTEM AND METHOD FOR CREATING AND MAINTAINING A DATABASE OF DISAMBIGUATED ENTITY MENTIONS AND RELATIONS FROM A CORPUS OF ELECTRONIC DOCUMENTS

CROSS-REFERENCE TO RELATED APPLICATIONS

This application is related to and claims the benefit of U.S. Provisional Patent Application No. 61/438,222, filed Jan. 31, 2011, and U.S. Provisional Patent Application No. 61/487,897, filed May 19, 2011, both of which are incorporated herein in their entirety by this reference.

FIELD OF ART

The invention relates to systems and methods for disambiguating ambiguous references to entities and relations. More particularly, the invention is directed to computer systems and computer-implemented methods for creating and maintaining disambiguated databases of entity mentions and mention relations from a corpus of electronic documents.

BACKGROUND

Human language is not always precise. It often requires using terms and phrases that, by themselves, may be ambiguous in terms of their meaning or their ability to distinguish and uniquely identify a particular person, place or thing. A word or phrase can be ambiguous because it may be associated with a plurality of different subjects or entities. A reference to "Paris," for instance, could refer to a city in the country of France, cities in the States of Texas, Tennessee or Illinois, or even a person (e.g., "Paris Hilton").

Ambiguity may also arise when a single entity, such as a person, organization or place, is routinely identified by or associated with a multitude of different words, phrases and/or abbreviations. For example, companies and organizations often have multiple trade names, abbreviations, nicknames or acronyms, while some company names are frequently misspelled. Still more ambiguity can arise, for example, when a large number of people share the same name (e.g., "Mr. John Smith"), when a famous individual shares a name with non-famous individuals (e.g., Mr. Michael Jackson), when a single individual is associated with potentially many different organizations simultaneously or consecutively over time, or when an organization has a large number of well-known heterogeneous parts, sub-organizations or subsidiaries (as in "The Smithsonian Institute," which has 19 museums, 9 research centers and more than 140 affiliate museums around the world).

Entity mention disambiguation is the process of resolving which unique entities (e.g., persons, organizations or places) are the intended subjects of certain references (typically referred to in the art as "mentions") in the documents of a given corpus of documents concerning certain names, words or phrases. Although humans are reasonably good at resolving ambiguous entity mentions in written and spoken language by using the context in which the ambiguous words or phrases appear, conventional automated systems and processes have heretofore failed to achieve adequate levels of performance and reliability in disambiguating entity mentions in electronic documents, especially when the sources of the electronic documents comprise very large collections, such as the National Library of Medicine's "PubMed" online database, or the United States Patent and Trademark Office's online patent database.

SUMMARY OF THE INVENTION

Embodiments of the present invention provide a computing system and method for creating an organized and augmentable database of disambiguated entity mentions from a corpus of electronic documents containing ambiguous or potentially ambiguous references about the entities. In certain embodiments, the present invention also provides a computer system and method for producing a disambiguated database of relations between mention objects. For purposes of this disclosure, the terms "ambiguous reference," "potentially ambiguous reference" encompasses any references, remarks, indications or discussions in an electronic document about an entity that may be considered ambiguous and potentially ambiguous.

In one aspect of the invention, there is provided a method for creating an electronic database of disambiguated entity mentions from a corpus of electronic documents using a microprocessor. The method comprises (a) automatically extracting the contents of the electronic documents in the corpus and parsing the entity mentions in the contents to produce a mention object for each entity mention extracted; (b) creating one or more mention groups by automatically grouping the mention objects together according to a distinguishing attribute common in a given class of mention objects; (c) selecting a mention group; (d) comparing every mention object in the selected mention group with every other mention object in the selected mention group to produce a collection of comparison algorithm scores for every pair of mention objects in the selected mention group, and an overall confidence score for every pair of mention objects in the selected mention group based on the collection of comparison algorithm scores for said every pair; (e) creating new entity objects by automatically grouping together mention objects for the selected mention group and merging previously-created entity objects with other previously-created entity objects, based on the confidence scores of each pair of mention objects, the confidence scores of each pair of entity objects, and a specified confidence threshold, so that pairs of mention objects and pairs of entity objects having a confidence score greater than or equal to the specified threshold are assigned to the same new entity objects; (f) storing the new entity objects in the electronic database of disambiguated entity mentions; and (g) repeating steps (c) through (f) above until all of the mention groups have been comparison processed.

Each entity object created and stored in the electronic database in the above-described process will contain identifiers for all of the mention objects that the system has determined are associated with the entity represented by the entity object. Thus, because of the grouping of all of the mention objects under the entity objects to which they refer, the electronic database of entity objects and associated mention objects created by the above process will comprise a disambiguated database of entity mentions. The organization and structure of the electronic database of disambiguated entity mentions permits all of the mention objects associated with a single entity object to be accessed and/or displayed as a group, a unit, a list or an index of descriptions, characteristics, relationships and achievements for the entity, as would be found, for example, in a resume or curriculum vitae for that single entity object.

As used herein, an "entity mention" may be any reference to a person, place or thing in the text of an electronic document. Thus, an "entity" could be, for example, an individual, an organization, or a place, e.g. "John Smith," or "University of California" or "Paris." A university is just one example of an organization entity. Other examples of organization entities may include, for instance, businesses, corporations, committees, governmental bodies, professional organizations, social groups or networks, neighborhoods, communities, and the like. Because of their potential for being ambiguous, entity mentions in electronic documents often need to be clarified and/or more distinctly identified before the reference can be put to more effective use.

As used herein, the term "electronic database" refers generally to a collection of data records, data tables, data items or data elements stored in a file or document on a computer system or network. In the context of the invention, databases are used to store, manipulate and manage, among other things, collections and groups of mention objects, entity objects, relation objects, source electronic document identifiers, algorithm scores, confidence scores, confidence thresholds, and so on. As is well known in the computer arts, the structure and organization of the data in an electronic database may be defined according to a well-known protocol, such as the Extensible Markup Language protocol (also known as "XML"), or a database schema. Thus, an XML document containing a multiplicity of XML tags delimiting groups or collections of entity objects and mention objects is considered one form of an electronic database of disambiguated entity mentions created by the invention. The arrangement, structure or protocol used by the electronic document or file comprising the electronic database (e.g., an XML document) enables users and/or other computer programs to quickly locate and process related objects in the electronic database.

Thus, it should be understood for purposes of this disclosure, as well as the appended claims and figures, that creating a group of database objects, or grouping database objects together (as described herein by the use of terms like "group creation," "entity object creation," "grouped," "grouping together," and so on) typically means creating, modifying or amending one or more XML objects or XML data elements in an XML document file (or, alternatively, creating, modifying or amending one or more database links in one or more database tables in a relational database file), which establishes logical associations between the objects in the "group," and permits those logically associated objects to be quickly and efficiently retrieved, displayed and/or manipulated as a single unit, a single object or a single group by the database management system. Therefore, it should be understood that where a step in the claimed inventive process calls for executing program instructions that cause the microprocessor to "group" objects together (or create a "group" of objects), as described herein and as used in the claims, this step does not necessarily mean that those objects are ever physically moved or placed in the same data structure, file or even the same computer system. Rather, this step means the microprocessor is used to create, establish and/or manipulate the appropriate XML object, XML tags or database links to logically associate the objects with one another so that all of the objects in a logical group may be quickly and efficiently accessed, retrieved and managed by the database system as a unit.

Embodiments of the present invention operate by extracting entity mentions and other content from a corpus of electronic documents, as well as explicit and implicit relations between those entities. Typically, the extracted content will be parsed to identify both ambiguous and unambiguous entity mentions about entities of interest, such as persons, organizations, places or things, as well as relations between entities. The identified and extracted entity mentions and relations are tagged with unique identifiers and stored in one or more databases or data tables as mention objects, entity objects and relation objects, during what will be referred to and described below as data harvesting.

The term "object" generally refers to a particular reference, a particular entity or a particular relation. Objects are tracked by putting them in one or more of the object databases provided. A "mention object," for example, may be stored in a database with other information pertinent to the source of the mention object, such as a unique identifier for the document from which the mention object was extracted, or it may sometimes be stored with other objects, such as relation objects or entity objects. The term "mention group" refers generally to a group or collection of mention objects or entity objects having a common distinguishing characteristic, e.g. the same last name.

In some embodiments, computer systems configured to operate according to embodiments of the invention may, in addition to determining and identifying, with some specified degree of confidence, which entity is more likely to be the entity referenced in a mention object, may also be configured to determine and record, with some specified degree of confidence, existing relationships between referenced entities based, for example, on the fact that two entities are mentioned together in a particular field of a structured electronic document. Thus, for example, if two different person entities are mentioned in the "Inventors" field of a structured electronic document comprising a published patent, then systems operating according to some embodiments of the present invention may be configured to create appropriate database links in the disambiguated electronic database to reflect the fact that these two person entities are related to one another as "co-inventors," and possibly "co-employees" of the same organization entity mentioned in the "Assignee" field of that published patent. Thus, as used herein, the terms "relation" and "relationship" may describe any type of relationship or connection between two referenced entities, which relationship can usually be discerned from the structure and organization of the document from which the references are extracted. Examples of relations would include, for instance, spouses, siblings, cousins, co-workers, co-authors, co-inventors, colleagues, affiliates, subsidiaries, parents, associates, partners, group members, friends, employers and employees, president, CFO, sister-city, and the like.

According to another aspect of the invention, there is provided an apparatus for creating an electronic database of disambiguated entity mentions from a corpus of electronic documents, comprising a microprocessor, a data harvesting module, a mention group creation module, a collection of comparison algorithms and an entity creation module. The data harvesting module comprises program instructions that will cause the microprocessor to automatically extract the entity mentions from the corpus of electronic documents and parse the entity mentions to produce one or more mention objects. The mention group creation module comprises program instructions that will cause the microprocessor to automatically create one or more mention groups by automatically grouping mention objects together according to a distinguishing attribute common to a given class of mention objects, such as "last name" or "first name." The collection of comparison modules include program instructions that will cause the microprocessor to automatically compare every mention object in each mention group with every other mention object in the mention group to produce a collection of comparison algorithm scores for every pair of mention objects in each mention group. The collection of comparison modules will also cause the microprocessor to generate an overall confidence score for every pair of mention objects in each mention group based on the collection of comparison algorithm scores for said every pair.

The entity creation module includes program instructions that cause the microprocessor to automatically create in the electronic database of disambiguated entity mentions one or more new entity objects for the selected mention group by automatically grouping mention objects with other mention objects, and by merging previously-created entity objects with other previously-created entity objects, based on the confidence scores of each pair of mention objects, the confidence scores of each pair of entity objects, and a specified confidence threshold. The pairs of mention objects and pairs of entity objects having a confidence score greater than or equal to the specified threshold are assigned to the same new entity object.

In some embodiments, the entity creation module produces a database of disambiguated mention objects by generating an XML document comprising a plurality of mention objects and entity objects, with XML tags defining and delineating which mention objects have been clustered together to form entity objects by the hierarchical fuzzy clustering algorithms described herein. In other embodiments, the entity creation module may have program instructions that cause the microprocessor to create one or more links for use in a relational database, which links serve to associate one or more mention objects in one table of the relational database, respectively, with one or more entity objects residing in the same or another table of the relational database. In other words, the entity creation module may be configured to create and arrange mention object identifiers and entity object identifiers in an XML document database or another type of database so that all of the mention objects that the system has determined should be associated with a particular entity are logically connected with each other. This may be accomplished, for example, by creating an XML document, such as the XML document example depicted below, wherein all the mention object identifiers associated with a particular entity are encapsulated by the appropriate computer-readable start and end tags for that particular entity. Such computer-readable XML document tags and relational database links provide a straightforward way for other computer programs to retrieve and display all of the mention and relation objects (i.e., references) that the system has determined, in accordance with the techniques and programmed modules described herein, should be associated with that particular entity.

Preferably, but not necessarily, a normalization module is also provided, which comprises program instructions configured to cause the microprocessor to normalize a distinguishing common attribute for each mention object in a given class according to a set of normalization rules prior to grouping the mention objects together based on the distinguishing common attribute. Normalization may be performed, for example, by performing ASCII letter substitution on Unicode characters, as is known in the industry. Executing these instructions on the microprocessor may also cause the microprocessor to assign a mention object having a name that is slightly misspelled to the same mention group as another mention object having a correctly-spelled version of that same name.

The program instructions in the collection of comparison modules may be configured to cause the microprocessor to determine whether a match exists between two mention objects in the selected mention group based on certain mention object attributes, including without limitation, a personal name attribute, an organization name attribute, an email address attribute, and an affiliated organization attribute. The program instructions on the microprocessor may also cause the microprocessor to determine whether the match exists according to a set of fuzzy logic object matching rules stored on the system.

According to some embodiments of the invention, the program instructions in the collection of comparison algorithms are further configured to cause the microprocessor to automatically compare every entity object in the selected mention group with every other entity object in the selected mention group to produce a collection of comparison algorithm scores for every pair of entity objects in the selected mention group. Then the microprocessor generates an overall confidence score for every pair of entity objects in the selected mention group based on the collection of comparison algorithm scores for said every pair of entity objects.

The contents of the electronic documents in the corpus may be arranged according to a predefined document structure. In this case, program instructions are provided that cause the microprocessor to extract and parse the contents into mention objects and relation objects in accordance with the predefined document structure. To accomplish this, the microprocessor employs a document schema comprising information representing the predefined document structure for the electronic documents in the corpus.

The microprocessor may also be configured to extract content from the corpus of electronic documents stored on a particular type of electronic document website according to a collection of site navigation and extraction rules, comprising information representing the predefined document structure for the electronic documents stored on the website. A web spider program also may be employed to cause the microprocessor to traverse and extract the contents of the electronic documents on one or more websites in accordance with the collection of site navigation and extraction rules.

In some cases, the contents of the electronic documents in the corpus may not be arranged according to a predefined document structure. In such cases, a natural language processor may be employed to cause the microprocessor to extract and parse the contents in accordance with a set of natural language rules.

The data harvesting module may also include program instructions configured to cause the microprocessor to automatically identify relations between the mention objects and store the identified relations in a relation object database.

According to yet another aspect of the invention, there is provided an apparatus for augmenting a preexisting database of disambiguated entity mentions, instead of creating a new database of disambiguated entity mentions, comprising a microprocessor, a document database having a set of records that uniquely identify each electronic document in the corpus that was used to create the disambiguated database, a mention group creation module, a set of comparison rules, a collection of comparison algorithms and an entity creation module.

In this embodiment, the data harvesting module includes program instructions that cause the microprocessor to automatically: (1) read the contents of each new electronic document in the corpus based on the set of records uniquely identifying the used electronic documents, (2) parse the contents of each new electronic document into a plurality of new mention objects in accordance with the predefined structure, (3) identify relations between the new mention objects based on the predefined structure, and (4) store the plurality of new mention objects and relations in one or more working or intermediate databases.

The mention group creation module includes program instructions that cause the microprocessor to retrieve the stored mention objects from the one or more working or intermediate databases and group them according to a distinguishing attribute common to a given class of mention objects. This is accomplished by first determining whether a mention object should be associated with an existing mention group or whether a new mention group should be created.

The collection of comparison algorithms includes program instructions that, when executed by the microprocessor, will cause the microprocessor to compare each new mention object in a selected mention group with every other mention object in the selected mention group, according to the set of comparison rules, to produce a collection of algorithm scores for each comparison pair and then produces a confidence score for each comparison pair based on the collection of algorithm scores for that comparison pair. In this step, new mention objects are compared to every other new mention object, as well as every previously-existing mention object. However, previously-existing mention objects are not compared to other previously-existing mention objects, as such comparisons would have been previously performed in an earlier execution of the program. This reduces the time required to augment the database of disambiguated entity mentions so that it now accounts for (i.e., factors into the disambiguation results) newly-added documents containing newly-added references, entities and relations, and thereby increases the speed and usefulness of the system.

The entity creation module includes program instructions that, when executed by the microprocessor, cause the microprocessor to automatically create one or more new entity objects for the selected mention group by automatically grouping together newly-extracted mention objects with other newly-extracted mention objects, and by merging previously-created entity objects with other previously-created entity objects, based on the confidence scores of each pair of mention objects, the confidence scores of each pair of entity objects, and a specified confidence threshold, wherein pairs of newly-extracted mention objects and pairs of entity objects having a confidence score greater than or equal to the specified confidence threshold are assigned to the same new entity object. The entity object creation module may also include program instructions that, when executed by the microprocessor will cause the microprocessor to augment the database of disambiguated mention objects by moving previously-existing mention objects or mention object identifiers to different previously-existing entity objects.

The program instructions in the comparison algorithms and the entity object creation module for this aspect of the invention are executed repeatedly by the microprocessor until all of the algorithms in the collection of comparison algorithms have been executed against the selected mention group, and all of the mention groups have been comparison processed by all of the comparison algorithms in the collection of comparison algorithms.

According to still another aspect of the invention, there is provided a non-transitory computer-readable storage medium with an executable program stored thereon for creating an electronic database of disambiguated entity mentions from a corpus of electronic documents. The executable program comprises instructions that cause a microprocessor to: (a) automatically extract entity mentions from the corpus of electronic documents and parse the entity mentions into mention objects; (b) create one or more mention groups by automatically grouping mention objects together according to a distinguishing attribute common to a given class of mention objects; (c) select a mention group from the one or more mention groups for comparison processing; (d) automatically compare every mention object in the selected mention group with every other mention object in the selected mention group to produce a collection of comparison algorithm scores for every pair of mention objects in the selected mention group; (e) generate an overall confidence score for every pair of mention objects in the selected mention group based on the collection of comparison algorithm scores for said every pair; (f) create one or more new entity objects for the selected mention group by automatically grouping together mention objects with other mention objects and automatically merging previously-created entity objects with other previously-created mention objects, based on the confidence scores of each pair of mention objects, the confidence scores of each pair of entity objects, and a specified confidence threshold; (g) store the created entity object in the electronic database of disambiguated entity mentions; and (h) repeat steps (c) through (g) until all of the one or more mention groups have been comparison processed.

As will be described in more detail below, embodiments of the present invention can efficiently store and augment entity disambiguation results over time using a data processing mechanism called hierarchal fuzzy object clustering, which is a combination of hierarchal clustering, fuzzy logic and object comparison.

BRIEF DESCRIPTION OF THE DRAWINGS

The present invention and various aspects, features and advantages thereof are explained in detail below with reference to exemplary and therefore non-limiting embodiments and with the aid of the drawings, which constitute a part of this specification and include depictions of the exemplary embodiments. In these drawings:

FIG. 5 shows a diagram illustrating an example of data harvesting according to an embodiment of the invention.

FIGS. 6 and 7 illustrate, by way of example, how a computer system configured to operate according to embodiments of the invention groups a plurality of person mention objects together to provide a set of disambiguated person entity mentions for two people.

FIGS. 8 and 9 together illustrate how a computer system configured to operate according to embodiments of the present invention would group a plurality of organization mention objects together to produce a set of disambiguated organization entity mentions for two organizations.

DETAILED DESCRIPTION OF EXEMPLARY EMBODIMENTS

The Exemplary Computer System

Figure 1:
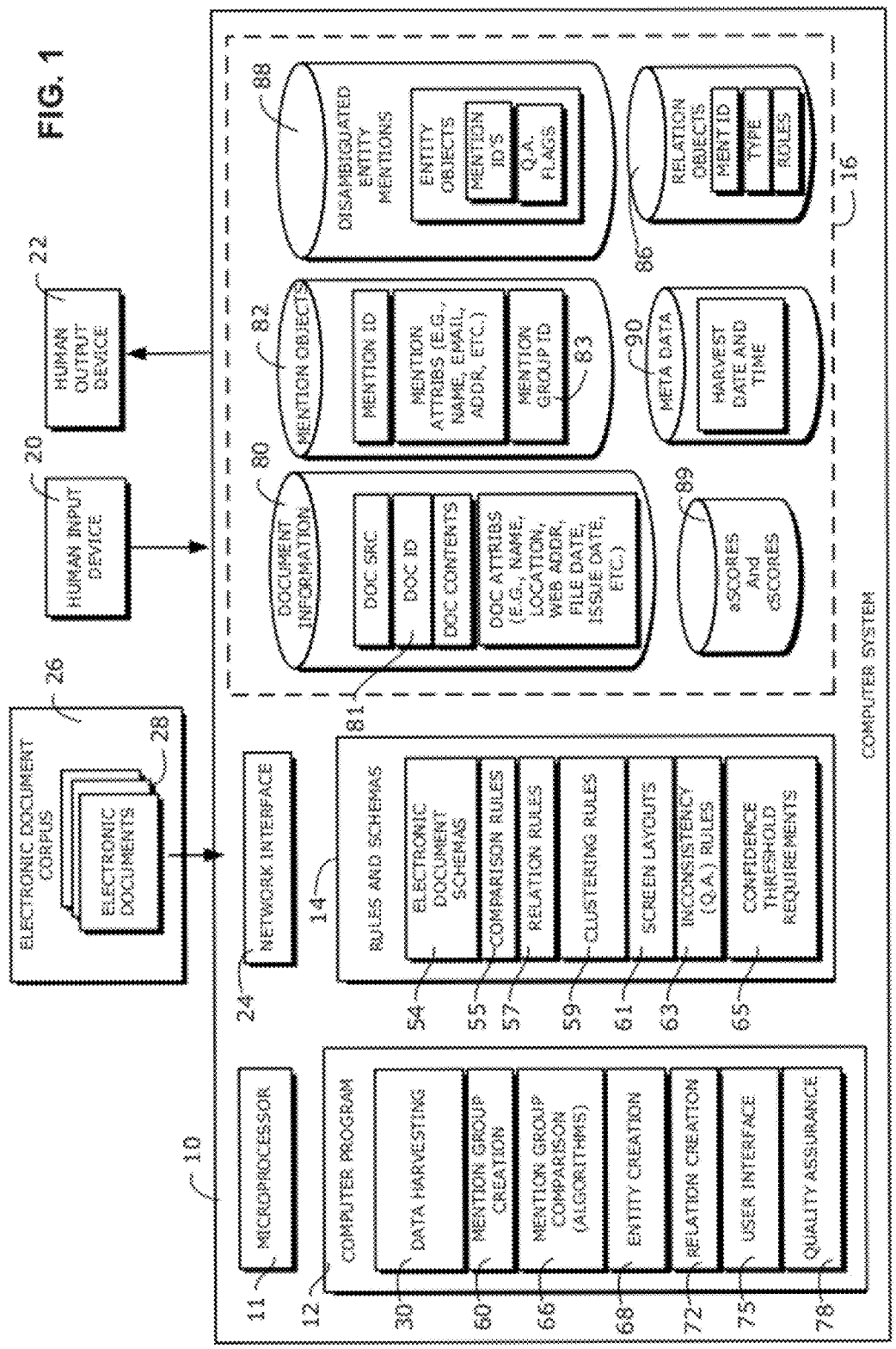
FIG. 1 shows a high-level block diagram of a computer system configured to operate according to one embodiment of the present invention.

FIG. 1 shows an exemplary computer system 10 for creating and augmenting a disambiguated database according to one embodiment of the present invention. As shown in FIG. 1, computer system 10 includes a microprocessor 11, a computer program 12 comprising a collection of software modules 30, 60, 66, 68 72, 75 and 78, a set of rules and schemas 14, and a data storage device 16, which comprises a plurality of files and/or databases 80, 82, 88, 86, 89 and 90. As the results of the disambiguation process are stored on the storage device 16, those results can be viewed, navigated and modified, as required, by a human user interacting with the computer system 10 via a human input device 20 and a human output device 22 operating under the control of a user interface module 75 in the computer program 12. A network interface 24 is provided to establish a connection to an electronic document corpus 26, comprising a multiplicity of electronic documents 28. The network interface 24 may also provide connectivity to remote terminals and remote computer systems (not shown) operated by other human users who wish to access and use the computer system 10.

The computer system 10 can be any general purpose, programmable digital computing device including, for example, a personal computer, a programmable logic controller, a distributed control system, or other computing device. The computer system can include a central processing unit (CPU) or microprocessor, random access memory (RAM), non-volatile secondary storage (e.g., a hard drive, a floppy drive, and a CD-ROM drive), and network interfaces (e.g., a wired or wireless Ethernet card and a digital and/or analog input/output card). Program code, such as the code comprising the computer program 12, and program data, such as rules and schemas 14, can be loaded into the RAM from the non-volatile secondary storage and provided to the microprocessor 11 for execution. The microprocessor 11 can generate and store results on the data storage device 16 for subsequent access, display, output and/or transmission to other computer systems and computer programs.

The computer program 12, which may comprise multiple hardware or software modules, discussed hereinafter, contain program instructions that cause the microprocessor 11 to perform a variety of specific tasks required to extract, parse, index, tag, disambiguate, store and report multiple classes of entity mentions and mention relations contained in electronic documents 28 in the electronic document corpus 26. These software modules are flexible, and may be configured to use a large variety of different processing rules and schemas 14, including without limitation, electronic document schemas 54, comparison rules 55, relation rules 57, clustering rules 59, screen layouts 61, inconsistency rules 63 and confidence threshold requirements 65. The purpose and function of each one of the computer software modules in the computer program 12 will now be described in more detail below.

Data Harvesting

A data harvesting module 30 reads different classes of electronic documents 28 from the electronic document corpus 26 via the network interface 24. Typically, each document in the corpus has a unique document identifier, which may be saved in a document ID file 81 of a document information database 80 on storage device 16. The data harvesting module 30 reads and extracts the contents of the electronic documents 28 to identify entity mentions and mention relations, and parses the entity mentions and mention relations, respectively, into mention objects and relation objects, and stores them, respectively, in mention objects database 82 and relation objects database 86 on storage device 16.

Figure 2:
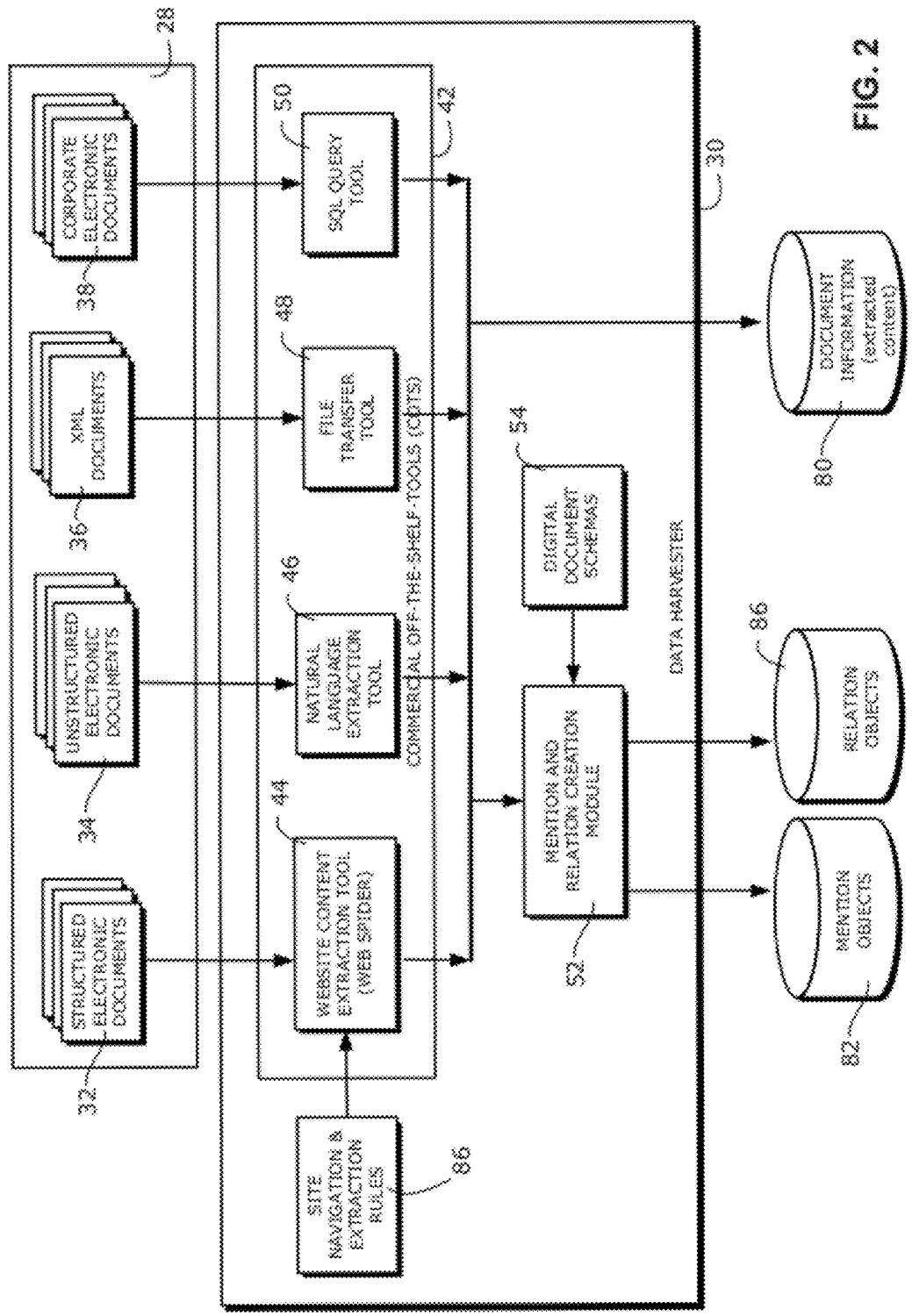
FIG. 2 shows a high-level block diagram of a data harvester according to an embodiment of the invention.

As shown in the block illustration of the data harvester 30 in FIG. 2, the classes of digital or electronic documents 28 supported may include structured electronic documents 32 (Example: US Patent Office Search Website), unstructured electronic documents 34 (Example: an HTML Wikipedia web site), XML Documents 36 (Example: a Pubmed article set download), and Corporate Electronic Documents 38 (Example: a SQL database view of an employee and his/her department information). The content from these different classes of digital documents may be extracted and stored in a data storage device 16, such as document information database 80 (in FIG. 1) using commercial off-the-shelf (COTS) tools 42. As shown in FIG. 2, these COTS tools may include, for example, a website content extraction tool 44 (Web Spider), a natural language extraction tool 46, a file transfer tool 48, or an SQL query tool 50.

A mention and relation creation module 52 in the data harvesting module 30 parses and tags the information and content extracted from the electronic documents 28 to create mention objects and relation objects, which are stored, respectively, in a mention objects database 82 and a relation objects database 86. The data harvesting module 30 may be configured to utilize a document schema from a collection of electronic document schemas 54 to parse and tag the extracted content. An illustration of the work performed by a data harvesting module on entity mentions according to an embodiment of the present invention is provided in the diagram depicted in FIG. 5. In particular, the diagram of FIG. 5 illustrates how a system configured to operate according to an embodiment of the invention uses the data harvesting module to extract a plurality of person and organization entity mentions from a corpus of electronic documents and, based on the extracted entity mentions and identified relations, produces a plurality of person and organization mention objects, as well as a plurality of relation objects. In this case, the data harvesting module creates person mention objects for "John Smith" and "JM Smith," organization mention objects for "Acme, Inc.," "UCLA" and "Cogs, Inc.," and relation mention objects indicating the relationship between the entities "John Smith" and "Acme" (Vice President of Sales), the relationship between "JM Smith" and "UCLA" (Alumni), and the relationship between "John Smith" and "Cogs, Inc." (Alumni).

Mention Group Creation

Returning now to FIG. 1, a mention group creation module 60 in the computer program 12 contains program instructions that, when executed by the microprocessor 11, cause the microprocessor 11 to create mention groups by grouping together mention objects which have similar characteristics. Mention groups are created by selecting a distinguishing attribute common to all mention objects and then normalizing and "fuzzifying" the attribute value to create a grouping mechanism that will be used to provide a fuzzy match of each mention object's attribute value to the group key. An example of this is to use a person's last name as the distinguishing attribute for a group of mention objects relating to a person. One way of "grouping together" mention objects to form mention groups is to assign the same mention group identifier to a collection of mention objects. These mention object identifiers may be stored, for example, in a file, database, or data element, such as mention group 83, on memory storage device 16. Mention groups are created in order to limit the number of mention objects that need to be compared with each other. By grouping mention objects and comparing only mention objects from the same group, the processing accuracy and throughput of the system are dramatically improved as compared to conventional disambiguation systems and processes, which compare all mention objects to each other, without regard to substantial dissimilarities in the characteristics of those mention objects.

As used herein, the term "group key" refers to a designation that the database uses to sort and group mention objects according to their common distinguishing attribute. For example, suppose the mention object database contains the following five mention objects: "John Smith," "Jack Smith," "Pauline Smith," "George Jones," and "Emily J. Jones." Then the mention group creation module 60 will create two groups from these mention objects, the first group, which is called the "Smith" group, will contain the John, Jack and Pauline mention objects, and the second group, which is called the "Jones" group, will contain the George and Pauline mention objects. Thus, Smith is the group key for the first group, and Jones is the group key for the Jones group. In relational database parlance, it is common to have a "key" field in each record. If there are 1000 records in a database table, and the database table has a "key field," then it means every record has at least one field (the key field) that has a value unique across the entire table. In other words, no two records will have the same value for the key field. In this case, saying "Smith" is the "group key" for the mention group means there is a mention group which can be identified as the "Smith" mention group because every object in that group has a last name of "Smith" in it.

In an exemplary embodiment, the mention group creation module 60 performs ASCII letter substitution on Unicode characters and includes within the same group hyphenated (maiden-married) and non-hyphenated versions of the same names. The algorithm can also match slightly misspelled name values using a modified Levenstein distance matching algorithm. The Mention Group Creation module 60 then generates and stores in a mention objects database 82 a mention group ID 81 for each mention group and assigns the same mention group identifier to each mention object in the mention group.

Mention Group Comparisons

The mention group comparison module 66 is a decision maker for the hierarchal fuzzy object clustering process referred to above. This module comprises program instructions that, when executed by the microprocessor 11, cause the microprocessor 11 to traverse all of the mention groups created my the mention group creation module 60, executing a collection of comparison algorithms on every pair of mention objects in the selected mention group to generate comparison algorithm scores (aScores) and update an overall confidence score (cScore), both of which may be appropriately stored, as discussed below in a separate database or file 89 on storage device 16. The cScore is a fuzzy comparison weighting mechanism used by the entity creation module 68 (described below) for associating mention objects with each other and/or merging preexisting entity objects with each other. Examples of some of the comparison algorithms that may be executed by the Mention Group Comparison Module are also described in more detail below.

Entity Creation (HFO Clustering)

The entity creation module 68 is the engine of the hierarchal fuzzy object clustering process. This module comprises program instructions that, when executed by the microprocessor 11, cause the microprocessor 11 to read all of the comparison results for a given mention group and an algorithm and recursively group together into new entity objects all of the pairs of mention objects that satisfy a specified confidence score threshold. Entity creation module 68 also compares all of the mention objects in pairs of previously-created entity objects and merges entity objects when the comparison between the preexisting entity objects yields a result that meets a confidence threshold store in the confidence threshold requirements register 65 of the rules and schemas 14. The result is a list or group of mention object identifiers identifying, respectively, a list or group of mention objects stored in mention objects database 82, which can be associated within a fuzzy level of certainty with the same entity, which entity is represented by an entity object. These entity objects are then stored in a database or file, illustrated in FIG. 1 as disambiguated entity mentions database 88, containing one or more entity objects, each entity object containing one or more mention object identifiers.

The structure and arrangement of the data in the disambiguated entity mentions database 88 (comprising, for example, tags when the database is an XML file, or database links when the database is relational database table) permit all of the mention objects stored in mention objects database 84, as well as all of the relation objects stored in the relation objects database 86, which are determined by the system to be associated with a particular entity object stored in disambiguated entity mentions database 88, to be accessed and retrieved as a group, thereby disambiguating the mention objects, relation objects and entity objects. Thus, each group accessed by way of using the database links will have an entity, an entity type (person or organization), a preferred name and list of mention objects and relation objects associated with the entity.

Quality Assurance

A quality assurance module 78 executes an algorithm using rules to check for inconsistencies in the entity objects. This module examines and attempts to validate the distinguishing attribute values (such as a person's forename) of the mention objects associated with each disambiguated entity. Any disambiguated entity's mention object that does not pass the consistency check may be flagged by the system and optionally investigated later by a human operator.

User Interface

A user interface module 75 generates content for output to a human output device 22, such as a display monitor, printer, or speaker, and processes input received from a human input device 20, such as a keyboard, pointing device or touch screen. The user interface module 75 allows a user to view and navigate the entity and relation objects stored in the data storage device 16, as well as any details associated with those entity and relation objects. A user employs the human input device 20, e.g. keyboard (not shown) to navigate the entity and relation objects stored in the database and view the details inside those objects through the human output device 22. The user may also use the human input device 20 to perform operations to manipulate and/or correct the information stored in the data storage device 16, under the control of the optional quality assurance module 78. The human output device 22 (e.g. monitor, printer and the like, not shown) can provide a display or printout showing the details of a disambiguated entity object stored in the entity objects database 88.

In some embodiments, the user interface module 75 may be configured to generate content which displays stored information in a variety of different forms, trees and network layouts, which allow the interrogation of entity object details. For example, a network layout may be used for displaying the mention objects and mention relations.

Data Storage (Database)

The data storage component 16 may comprise one or more separate data storage devices, as shown. Alternatively, data storage 16 may be implemented in a single storage device having a plurality of files or a plurality of segmented memory tables operating under the control of a database management system (not shown), but which may be incorporated into the data storage component 16 or which may be a separate processor. The data storage device 16 may house a document information database 80 for storing data associated with the electronic documents 28, a mention objects database 82 for storing mention objects and data associated with the mention objects, a relation objects database 86, and a disambiguated entity mentions database 88. Some of these databases, such as disambiguated entity mentions database 88, may comprise an XML document containing XML tags delineating the entity object and mention object data elements. The entity objects store 88 may also contain entity ID data and QA flags as desired. Meta Data store 90 stores meta data associated with data manipulation and the like. Algorithm scores (aScores) and confidence scores (cScores) may be appropriately stored in aScores and cScores database 89. Additional or alternative types of data storage systems capable of storing data representing the electronic documents 28 may be employed as desired, including but not limited to hierarchical databases, a relational database, XML databases and/or flat tables.

Database of Disambiguated Mention Objects (in an XML Document)

As previously stated, the database of disambiguated entity mentions created by embodiments of the present invention such as the database 88 shown in FIG. 1, may comprise an XML file, residing in storage device 16, which includes entity objects and mention object identifiers for mention objects that have been extracted from the electronic document corpus 28. In this case, the entity objects and mention objects in the XML document are suitably arranged and tagged using the XML protocol in order to associate each mention object with a particular entity object. One example of such an XML document database that might be created by embodiments of the present invention is shown here.

Exemplary Database of Disambiguated Entity Mentions (XML Document Format)

```
<?xml version="1.0" standalone="yes"?>
<PersonClustering id="ANDERSEN" cScore="0.8">
    <PropertyList/>
    <ClusteringLog>
        <Clustering timestamp="2011-06-28 14:04:52" user="SYSTEM" children="11">
            <Entity timestamp="2011-06-28 14:04:52" id="120">
                <EntityId>120</EntityId>
                <Header>
                    <Name userSpecifiedYN="N">
                        <LastName>Andersen</LastName>
                        <Forename>Anders Nyboe</Forename>
                        <Initials>AN</Initials>
                    </Name>
                    <Notes/>
                </Header>
                <MentionId>PM-14747193-7</MentionId>
                <MentionId>PM-14678092-6</MentionId>
                <MentionId>PM-19342041-6</MentionId>
                <MentionId>PM-16903840-3</MentionId>
                <MentionId>PM-18635528-7</MentionId>
                <MentionId>PM-19874293-4</MentionId>
                <MentionId>PM-11573373-3</MentionId>
            </Entity>
            <Entity timestamp="2011-06-28 14:04:52" id="121">
                <EntityId>121</EntityId>
                <Header>
                    <Name userSpecifiedYN="N">
                        <LastName>Andersen</LastName>
                        <Forename>Claus Yding</Forename>
                        <Initials>CY</Initials>
                    </Name>
                    <Notes/>
                </Header>
                <MentionId>PM-20172869-4</MentionId>
                <MentionId>PM-20228388-1</MentionId>
                <MentionId>PM-19874293-3</MentionId>
                <MentionId>PM-16113042-2</MentionId>
                <MentionId>PM-18635528-2</MentionId>
                <MentionId>PM-19342041-2</MentionId>
                <MentionId>PM-11573373-1</MentionId>
            </Entity>
            <Entity timestamp="2011-06-28 14:04:52" id="122">
                <EntityId>122</EntityId>
                <Header>
                    <Name userSpecifiedYN="N">
                        <LastName>Andersen</LastName>
                        <Forename>Anders Nyboe</Forename>
                        <Initials>AN</Initials>
                    </Name>
                    <Notes/>
                </Header>
                <MentionId>PM-15665017-3</MentionId>
            </Entity>
            <Entity timestamp="2011-06-28 14:04:52" id="123">
                <EntityId>123</EntityId>
                <Header>
                    <Name userSpecifiedYN="N">
                        <LastName>Andersen</LastName>
                        <Forename>Anders Nyboe</Forename>
                        <Initials>AN</Initials>
                    </Name>
                    <Notes/>
                </Header>
                <MentionId>PM-14602766-5</MentionId>
            </Entity>
            <Entity timestamp="2011-06-28 14:04:52" id="124">
                <EntityId>124</EntityId>
                <Header>
                    <Name userSpecifiedYN="N">
                        <LastName>Andersen</LastName>
                        <Forename>A Nyboe</Forename>
                        <Initials>AN</Initials>
                    </Name>
                    <Notes/>
                </Header>
                <MentionId>PM-16113042-6</MentionId>
            </Entity>
            <Entity timestamp="2011-06-28 14:04:52" id="125">
                <EntityId>125</EntityId>
                <Header>
                    <Name userSpecifiedYN="N">
                        <LastName>Andersen</LastName>
                        <Forename>Anders Nyboe</Forename>
                        <Initials>AN</Initials>
                    </Name>
                    <Notes/>
                </Header>
                <MentionId>PM-15388679-6</MentionId>
            </Entity>
            <Entity timestamp="2011-06-28 14:04:52" id="126">
                <EntityId>126</EntityId>
                <Header>
                    <Name userSpecifiedYN="N">
                        <LastName>Andersen</LastName>
                        <Forename>A Nyboe</Forename>
                        <Initials>AN</Initials>
                    </Name>
                    <Notes/>
                </Header>
                <MentionId>PM-16684840-6</MentionId>
            </Entity>
            <Entity timestamp="2011-06-28 14:04:52" id="127">
                <EntityId>127</EntityId>
                <Header>
                    <Name userSpecifiedYN="N">
                        <LastName>Andersen</LastName>
                        <Forename>Anders Nyboe</Forename>
                        <Initials>AN</Initials>
                    </Name>
                    <Notes/>
                </Header>
                <MentionId>PM-17573855-3</MentionId>
            </Entity>
            <Entity timestamp="2011-06-28 14:04:52" id="128">
                <EntityId>128</EntityId>
                <Header>
                    <Name userSpecifiedYN="N">
                        <LastName>Andersen</LastName>
                        <Forename>Claus Yding</Forename>
```

-continued

```
            <Initials>CY</Initials>
        </Name>
        <Notes/>
    </Header>
    <MentionId>PM-19264478-9</MentionId>
</Entity>
<Entity timestamp="2011-06-28 14:04:52" id="129">
    <EntityId>129</EntityId>
    <Header>
        <Name userSpecifiedYN="N">
            <LastName>Andersen</LastName>
            <Forename>C Yding</Forename>
            <Initials>CY</Initials>
        </Name>
        <Notes/>
    </Header>
    <MentionId>PM-16684840-8</MentionId>
</Entity>
<Entity timestamp="2011-06-28 14:04:52" id="130">
    <EntityId>130</EntityId>
    <Header>
        <Name userSpecifiedYN="N">
            <LastName>Andersen</LastName>
            <Forename>JÅ,rn</Forename>
            <Initials>J</Initials>
        </Name>
        <Notes/>
    </Header>
    <MentionId>PM-19818599-3</Mentionid>
</Entity>
</Clustering>
<Clustering children="3" timestamp="2011-06-30 11:45:02" user="laino">
    <Entity timestamp="2011-06-30 11:43:24" id="120">
        <EntityId>120</EntityId>
        <Header>
            <Name userSpecifiedYN="N">
                <Initials>AN</Initials>
                <AsciiLastName>ANDERSEN</AsciiLastName>
                <Forename>Anders Nyboe</Forename>
                <LastName>Andersen</LastName>
            </Name>
            <Notes/>
        </Header>
        <MentionId>PM-14747193-7</MentionId>
        <MentionId>PM-14678092-6</MentionId>
        <MentionId>PM-19342041-6</MentionId>
        <MentionId>PM-16903840-3</MentionId>
        <MentionId>PM-18635528-7</MentionId>
        <MentionId>PM-19874293-4</MentionId>
        <MentionId>PM-11573373-3</MentionId>
        <MentionId>PM-15388679-6</MentionId>
        <MentionId>PM-16113042-6</MentionId>
        <MentionId>PM-16684840-6</MentionId>
        <MentionId>PM-17573855-3</MentionId>
        <MentionId>PM-14602766-5</MentionId>
        <MentionId>PM-15665017-3</MentionId>
    </Entity>
    <Entity timestamp="2011-06-30 11:45:02" id="121">
        <EntityId>121</EntityId>
        <Header>
            <Name userSpecifiedYN="N">
                <Initials>CY</Initials>
                <AsciiLastName>ANDERSEN</AsciiLastName>
                <Forename>Claus Yding</Forename>
                <LastName>Andersen</LastName>
            </Name>
            <Notes/>
        </Header>
        <MentionId>PM-20172869-4</MentionId>
        <MentionId>PM-20228388-1</MentionId>
        <MentionId>PM-19874293-3</MentionId>
        <MentionId>PM-16113042-2</MentionId>
        <MentionId>PM-18635528-2</MentionId>
        <MentionId>PM-19342041-2</MentionId>
        <MentionId>PM-11573373-1</MentionId>
        <MentionId>PM-16684840-8</MentionId>
        <MentionId>PM-19264478-9</MentionId>
    </Entity>
    <Entity timestamp="2011-06-28 14:04:52" id="130">
        <EntityId>130</EntityId>
        <Header>
            <Name userSpecifiedYN="N">
                <LastName>Andersen</LastName>
                <Forename>JÅ,rn</Forename>
                <Initials>J</Initials>
            </Name>
            <Notes/>
        </Header>
        <MentionId>PM-19818599-3</MentionId>
    </Entity>
</Clustering>
</ClusteringLog>
</PersonClustering>
```

The XLM document database shown above illustrates the output of the entity creation module when the entity referenced by the mention objects is a person entity. In this case, the XML data shows person "Clusterings" for the person entity "ANDERSEN," as indicated by the "PersonClustering" tag and ID at the top of the file. A "Clustering" is the resulting set of entity objects and their associated mention objects that result from executing the entity creation module to "cluster" and "recluster" mention objects and entity objects according to embodiments of the present invention. A new Clustering is created and appended to the file each time a different hierarchical fuzzy logic comparinson algorithm is run to "recluster" mention objects to and thereby revise the Entity Objects (or Entity XML Elements). Thus, the above file contains two Clusterings. Note that the start tag "<ClusteringLog>" and the end tag "<\ClusteringLog>" delineate the beginning and end, respectively, of each Clustering element in the file.

The first Clustering in the file shown above, which resulted from the first comparison algorithm, contains 11 entity objects, which are indentified by EntityIDs 120-130, containing a total of twenty-three mention objects. The first entity object (EntityID=120) contains seven mention of the twenty-three mention objects. Thus entity object 120, is represented in the file as:

```
<Entity timestamp="2011-06-28 14:04:52" id="120">
    <EntityId>120</EntityId>
    <Header>
        <Name userSpecifiedYN="N">
            <LastName>Andersen</LastName>
            <Forename>Anders Nyboe</Forename>
            <Initials>AN</Initials>
        </Name>
        <Notes/>
    </Header>
    <MentionId>PM-14747193-7</MentionId>
    <MentionId>PM-14678092-6</MentionId>
    <MentionId>PM-19342041-6</MentionId>
    <MentionId>PM-16903840-3</MentionId>
    <MentionId>PM-18635528-7</MentionId>
    <MentionId>PM-19874293-4</MentionId>
    <MentionId>PM-11573373-3</MentionId>
</Entity>
```

But as a result of the system executing a second hierarchical fuzzy logic comparison algorithm, the second Clustering contains only three entity objects, which are identified as entity objects 120, 121 and 130. Therefore, it should be understood that, as a result of the second Clustering, the 23 mention objects previously assigned to a total of eleven entity objects have now been regrouped and reassigned so that they are now associated with only 3 entity objects. Thus, the mention objects for the person entity "ANDERSEN" have been further disambiguated in the second Clustering so as to reduce the potential number of "ANDERSEN" person entities referenced by the mention objects from eleven to three.

Embodiments of the present invention may also be configured to produce a relation object database, such as relation object database 86 in FIG. 1, comprising relation objects, mention object identifiers, relation type identiers, and relation role identifiers, all arranged to indicate relationships between disambiguated mention objects. The relation object database 86 may comprise, for example, an XML document with the appropriate XML objects, start tags and end tags to indicate the relations between two or more mention objects. An example of the contents of such an XML document database for relation objects is shown here:

```
<Relation cScore="1" type="AFFILIATE">
    <MentionId role="unknown">PM-16406018-1</MentionId>
    <MentionId role="organization">PM-16406018-9</MentionId>
</Relation>
<Relation cScore="1" type="ASSOCIATE">
    <MentionId role="unknown">PM-16406018-1</MentionId>
    <MentionId role="unknown">PM-16406018-2</MentionId>
    <MentionId role="unknown">PM-16406018-3</MentionId>
    <MentionId role="unknown">PM-16406018-4</MentionId>
    <MentionId role="unknown">PM-16406018-5</MentionId>
    <MentionId role="unknown">PM-16406018-6</MentionId>
    <MentionId role="unknown">PM-16406018-7</MentionId>
    <MentionId role="unknown">PM-16406018-8</MentionId>
</Relation>
<Relation cScore="1" type="SOURCE">
    <SourceId role="none">PM-16406018</SourceId>
    <MentionId role="author">PM-16406018-1</MentionId>
    <MentionId role="co-author">PM-16406018-2</MentionId>
    <MentionId role="co-author">PM-16406018-3</MentionId>
    <MentionId role="co-author">PM-16406018-4</MentionId>
    <MentionId role="co-author">PM-16406018-5</MentionId>
    <MentionId role="co-author">PM-16406018-6</MentionId>
    <MentionId role="co-author">PM-16406018-7</MentionId>
    <MentionId role="co-author">PM-16406018-8</MentionId>
</Relation>
```

The sample XML document content above shows three relation objects, having relation types of "AFFILIATE," "ASSOCIATE" and "SOURCE," respectfully, that might be produced by an embodiment of the invention based on the extraction of entity mentions from an electronic document. The relations are then used by the microprocessor during execution of the collection of comparison algorithms to further disambiguate the mention objects identified by the mention object identifiers. For example, the "ASSOCIATE" relation object in the XML document above contains eight different person mention object identifiers. This relation object may then be accessed and used by a "known associates" comparison algorithm, as described in more detail below, to further disambiguate the associated mention objects.

Figure 3:
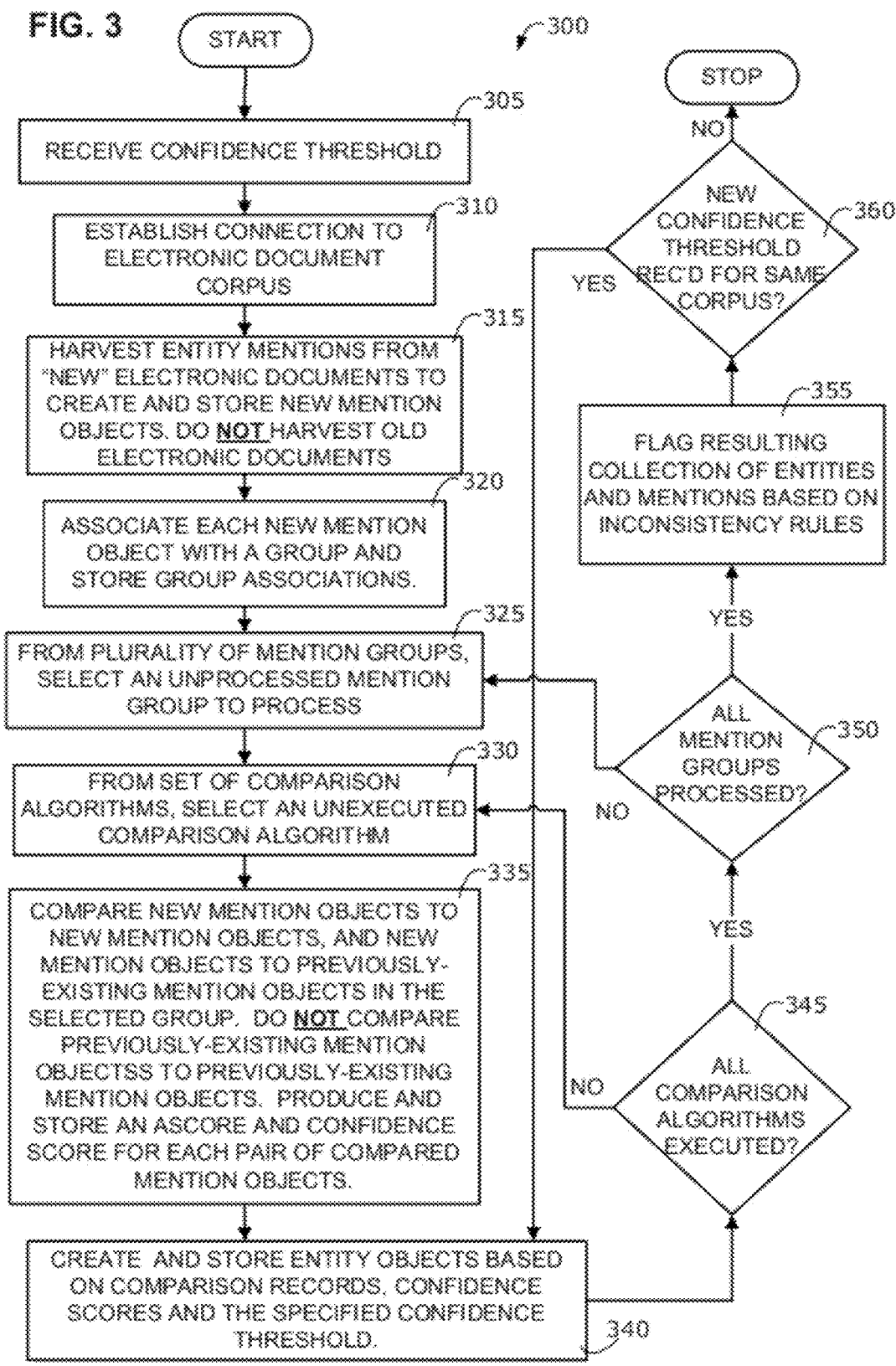
FIG. 3 shows a flow diagram illustrating by way of example the steps that may be performed by a computer system for creating and maintaining a database of disambiguated entity mentions from a corpus of electronic documents in accordance with the one embodiment of the present invention.

FIG. 3 shows a flow diagram illustrating, by way of example, the steps in a procedure 300 that may be implemented, in accordance with certain embodiments of the present invention, such as the computer system 10 shown in FIG. 1, to create and maintain a disambiguated database based on data extracted from a corpus of electronic documents. The procedure 300 may be implemented as a conventional computer software program comprising a plurality of functional modules each having program instructions for execution by the microprocessor 11 of FIG. 1, or it may be implemented by another suitable device. The procedure 300 may also be implemented as a method carried out manually by a human operator.

As illustrated in FIG. 3, the first step 305 in the procedure 300 includes receiving a specified confidence threshold. The confidence threshold, which the system uses to determine whether two mention objects (or two mention clusters) should be assigned to the same cluster, may be provided by a human via a conventional human input device, such as a keyboard (shown as human input device 20 in FIG. 1), or it may be provided by electronic communication with another computer system or process. Alternatively, in the absence of input from a human operator or separate process, or in addition to it, the system also may be configured to use a "default" confidence threshold that could be "hard coded" into one or more of the software modules used to implement the procedure 300. In essence, the confidence threshold is a numeric expression of the tolerance for errors in the hierarchical fuzzy logic clustering process.

Next, at step 310, the system establishes a connection to the electronic document corpus 26. Typically, this connection comprises wired or wireless data communications link over a local or wide area network, such as the Internet, via a network interface, such as network interface 24 in FIG. 1. In step 315, a data harvester module, such as data harvester 30, reads or scans the electronic documents 28 in the electronic document corpus 26, looking for "new" electronic documents, i.e., electronic documents that were not read, scanned or processed during a previous execution of procedure 300. As new documents are found, the data harvester module extracts entity mentions from the electronic documents and parses and tags the entity mentions to create to create and store mention objects based on the parsed entity mentions. The mention objects may be stored, for example, in a mention objects database 84, or any other suitable file or table in data storage device 16. Old digital documents, i.e., digital documents that were processed in previous execution of the procedure 300, do not need to be extracted, parsed and tagged again because, in preferred embodiments of the present invention, all of the mention objects from the old digital documents are already parsed, tagged and stored in mention object database 84, and therefore, remain accessible to the system for further use and disambiguation.

At step 320, each stored mention object is associated with a particular group of other mention objects, according to a common attribute, such as last name (if the mention object relates to a person), and all of the group identifiers and associations are also stored in the data storage device 16. The computer program is configured to next execute a series of steps repeatedly so that each one of the mention groups will be consecutively processed until all of the mention groups created in step 320 are processed. This repeated series of steps is represented in FIG. 3 by the steps 325, 330, 335, 340, 345 and 350, which define a programmatic loop. Nested inside of this programmatic loop, is a second programmatic loop defined by steps 330, 335, 340 and 345, which is arranged and configured so as to consecutively execute against each mention group every comparison algorithm in a set of comparison algorithms.

Thus, as shown at step 325, an as-yet unprocessed mention group is selected. Then, at step 330, a comparison algorithm which has not yet been executed on the selected mention group is selected. The selected comparison algorithm is then executed so as to compare every new mention objects to every other new mention object, as well as to every previously-existing mention object, in order to produce and store a comparison algorithm score (aScore) and a confidence score (cScore) for each pair of compared mention objects. See step 335. The rules by which the aScores and cScores are assigned for each pair of mention objects are described in more detail below. Notably, since the previously-existing mention objects were already compared with all of the other previously-existing mention objects in a previous execution of procedure 300, and the aScores and cScores from the previous comparisons preserved and accessible in the storage device 16, there is no reason in step 335 to compare any previously-existing mention objects with any other previously-existing mention objects.

Next, at step 340, in a process referred to herein as "clustering," mention objects are assigned to entity objects based on the specified confidence threshold, as well as the comparison algorithm scores (aScores) and confidence scores (cScores) for each pair of mention objects. In particular, if the aScores and the cScore for a pair of compared mention objects (or a pair of compared entity objects) meets or exceeds the specified confidence threshold, then the pair of compared mention objects (or entity objects) are assigned to the same entity object. In such case, the pair of mention objects are considered to be associated with the same entity, thereby helping to further disambiguate the entity based on the mention objects (or "clusterings" of mention objects and entity objects). Thus, if the system determines, with a confidence score that meets or exceeds the specified confidence threshold, that all of the new mention objects in a newly-created entity object refer to an entity known by the system as the "John Smith" entity object, then the system will automatically create an XML object in an XML document that puts identifiers for all of the mention objects referring to the entity "John Smith" inside the entity object associated with "John Smith."

At step 345, the system determines whether all of the comparison algorithms in the set of comparison algorithms have been executed against the currently selected mention group. If the answer is no, then control passes again to step 330, wherein another unexecuted comparison algorithm is selected and then executed against every pair of mention objects in the currently selected mention group in order to produce another aScore for each pair of mention objects in the currently selected mention group. Thus, steps 330, 335, 340 and 345 are repeated until every comparison algorithm in the set of comparison algorithms has been executed against the currently selected mention group.

For instance, if the entity to be disambiguated is a person, then the set of comparison algorithms may comprise, for example, a first comparison algorithm that compares the last name of every mention object to the last name of every other mention object in the mention group, a second comparison algorithm that compares the first name of every mention object to the first name of every other mention object in the selected mention group, a third comparison algorithm that compares the middle name or initial of every mention object in the selected mention group to the middle name or initial of every other mention object in the selected mention group. In this fashion, each comparison algorithm in the collection of comparison algorithms generates an additional aScore for every comparison pair in the currently selected mention group.

If, on the other hand, it is determined at step 345 that every comparison algorithm has now been executed against the currently selected mention group, control passes to step 350 in FIG. 3, where the system determines whether all of the mention groups have been processed. If the answer is no, then control passes again to step 325, where another unprocessed mention group is selected for processing. Thus, steps 325, 330, 335, 340, 345 and 350 will be executed repeatedly until every mention group in the plurality of mention groups has had every one of its group members compared by every other group member multiple times in accordance with the multiplicity of comparison algorithms. Thus, if the system creates N mention groups, each having M mention objects, and also provides a set of X comparison algorithms, then the two programmatic loops described above would operate to perform a total of Y comparisons, where $Y=N*[X*(M-1)!]$ When it is determined at step 350 that all of the mention groups have been processed, then, in preferred embodiments, the resulting collection of mention objects and entity objects are reviewed and flagged for inconsistencies by an automated quality assurance module 78, or alternatively, reviewed and flagged for inconsistencies by a human operator. See Step 355. Mention objects assigned to flagged entity objects may then be set aside and/or manually re-assigned to different entity objects to resolve the inconsistencies.

Finally, at step 360, the system determines whether a new confidence threshold has been received for the same corpus of electronic documents, either electronically or by human user input. This may occur, for example, when a system operator receives a request from a customer to run the disambiguation procedure on the same corpus of electronic documents, but with a different tolerance level for potential ambiguities. If a new confidence threshold has been received, then control passes again to step 340, where all of the mention objects and mention clusters are re-assigned and re-stored based on the new confidence threshold and the old aScores and cScores. Thus, unlike conventional disambiguation systems, the present invention enables augmentation of the disambiguated database of entity mentions, based on a new confidence threshold, without having to re-read, re-extract and re-process all of the documents in the corpus a second time. Instead, embodiments of the present invention can retrieve previously calculated aScores and cScores, which enables faster and more efficient re-clustering based on a newly-specified confidence threshold requirement.

Regarding step 340 of procedure 300, it is noted that this step may include combining or "merging" two preexisting entity objects to create a new, larger entity object. While the values of mention objects do not change when they are combined with other mention objects to form a new entity object, the values of entity objects (each entity object comprising multiple mention objects) can change every time one entity object is combined with another entity object to form a new entity object. Thus, the values of entity objects being compared can change every time "re-clustering" is performed. This is because the act of clustering together entity objects to form new entity objects has the potential to change the data about that new entity object, such that when the comparison algorithm is run, a different entity object results. By analogy, a mention object is indivisible and, therefore, a value associated with a mention object, such as a last name, cannot change. However, an entity object may be further sub-divided, allowing for the values associated with that particular entity object, such as a last name, to change.

Hierarchical Fuzzy Object Clustering

Figure 4:
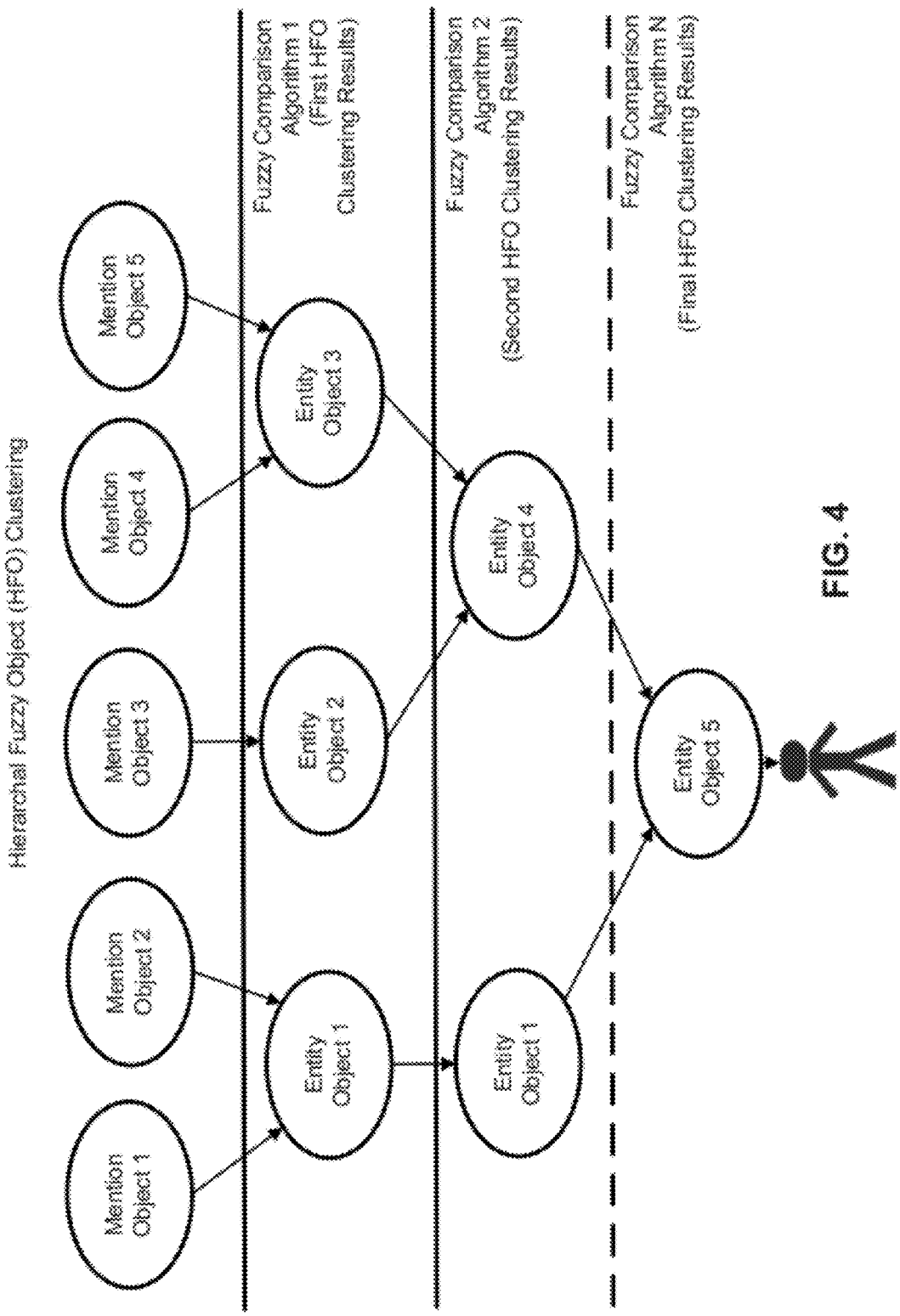
FIG. 4 illustrates an example of Hierarchal Fuzzy Object Clustering according to an embodiment of the invention.

Hierarchal fuzzy object clustering, illustrated schematically in FIG. 4, combines several comparison and clustering techniques—Hierarchal Clustering, Fuzzy Logic and Object Comparison. The approach uses a library of multiple algorithms to compare pairs of mention objects and pairs of entity objects to each other. It should be understood that a pair comprises two objects of the same type. Suppose, for example, mention object 1 in FIG. 4 is "john smith"; mention object 2 is "jack smith," and mention object 3 is "paulene smith." These three mention objects may be assigned to the same mention group, i.e., the "Smith" mention group because they all have a common last name. Thus, a pair of mention objects may comprise, for example, the john smith mention object 1 and the pauline smith mention object 3. At Fuzzy Comparison Algorithm 1, the system will first perform a fuzzy comparison of mention object values for the pair comprising the john smith mention object 1 with the jack smith mention object 2 to determine whether the pair of mention objects should be combined to form a single entity object. Mention object 1 is thus first compared to mention object 2, and then mention object 1 is separately compared to mention object 3, and then mention object 2 is separately compared to mention object 3. As a result of the comparisons, mention object 1 and mention object 2 are put into the same entity object, namely entity object 1, and mention object 3 is put into a different entity object, namely entity object 2. As noted, this is done by the Entity creation module based on the aScores and cScores created by the mention group comparison Module. This "clustering" could indicate, for example, that John and Jack might actually be ambiguous references for the same entity, i.e., the person "Jonathan Archibald Smith" of Dallas, Tex., who is sometimes called "Jack."

Entity creation module 68 reads all comparison results for a particular mention group in order to determine whether certain mention object pairs should be combined to make an entity object, such as entity object 1, which was created as a result of the scores produced by fuzzy comparison algorithm 1), and whether two entity objects should be combined to make a new single entity object, such as entity object 4, which was created by combining entity object 2 with entity object 3 as a result of the scores produced by fuzzy comparison algorithm 2.

For each level in the hierarchy shown in FIG. 4, a comparison algorithm is executed. The comparisons are performed on the objects in the same level of the hierarchy, i.e., mention object 1 through mention object 5 in the first level of the hierarchy; entity object 1 through entity object 3 in the second level of the hierarchy; entity object 1 and entity object 4 in the N-th level of the hierarchy. The Entity creation module 68 associates mention objects and/or entity objects based on the comparison of the pair meeting a confidence score threshold. The result is a new set of entity objects at the next level in the hierarchy. The process then executes the next algorithm for the most recently created level in the hierarchy, and so on, until the rules that control this process deem the algorithms no longer need to be executed for this electronic document corpus because the specified confidence threshold has been satisfied.

One advantage of this approach is that comparisons are only performed until the confidence threshold is satisfied for a comparison pair. All algorithms do not need to be executed for every possible comparison pair. Also, when comparing entity objects, it is only necessary to compare the mention objects in each entity object until a satisfactory confidence score is achieved. This further reduces the total number of comparisons that need to be performed.

As a result of executing the above-described processes, embodiments of the invention are capable of producing a collection of entity objects, wherein each entity object contains a list of mention objects that can be associated with a single disambiguated entity within a fuzzy level of certainty. See for example, FIGS. 5-9 which further illustrate the process. Moreover, all relations associated with the mentions represented by the mention objects can be associated with the disambiguated entity.

Processing an Augmented Document Corpus

A significant advantage of the present invention is its ability to process additional electronic documents that may be subsequently added to the document corpus and augment the database of disambiguated entities and relations without needing to reprocess all of the electronic documents in the corpus that were previously processed by the system. This feature provides the benefit of more efficient and timely data processing as documents are added to the corpus over time.

When new documents are added to the corpus, the data harvesting module only processes the documents that are not already stored in the system's database. Once the mentions and relations are extracted from the new documents and stored. The only comparisons performed are between the new mention objects and the existing cluster objects. This provides the benefit of not needing to re-compare all of the preexisting mentions from the previous document corpus.

The newly introduced mention objects populate a new level in the clustering hierarchy. This level contains all of the existing cluster objects generated for the last algorithm execution and all of the new mention objects. The level is then processed as before and new levels in the hierarchy are created for each comparison algorithm executed until the rules controlling the Hierarchal fuzzy object clustering terminate the process and create the latest result sets of entity and relation objects.

Mention/Cluster Comparison Algorithms

In an exemplary embodiment of the present invention, each algorithm in a collection of comparison algorithms is executed against each group of mention objects and/or derived cluster objects. The two objects being compared, be they mention objects or cluster objects, will be referred to in the remainder of this section as the comparison pair.

The objects comprising the comparison pair are always of the same type—person, organization, location, and the like.

All comparisons are performed within a single mention group—meaning only mention objects and derived cluster objects that have been associated with the same group can be compared with each other. The purpose of each comparison algorithm in the collection of comparison algorithms is to generate, for every comparison pair in each group, one or more algorithm scores ("aScores") and potentially increase the confidence score ("cScore") of the comparison pair.

The aScore(s) produced by each comparison algorithm can be used by the generating comparison algorithm, as well as other comparison algorithms in the collection of comparison algorithms, to calculate an overall cScore for the comparison pair. In other words, a given comparison algorithm can generate new aScore(s) as well as re-use aScores stored by previously executed algorithms. The calculated cScore generated by the algorithm is then compared to the current cScore of the comparison pair. If the new cScore if greater than the existing cScore then the new cScore replaces the existing one for the comparison pair. The approach has the advantage of not needing to repeat a computation- or time-intensive comparison that may be used by several algorithms.

The comparison pair's cScore is used by the cluster creator to determine which mention object and/or cluster objects will be clustered and considered the same entity. For example, if one or more of the comparison algorithms in the collection of comparison algorithms updates a comparison pair's cScore to a specified threshold (Example: 0.8) or greater the comparison pair will be considered belonging to the same entity. Algorithms that execute later may skip prospect comparison pairs that have already been deemed belonging to the same entity However if the cScore for the pair is less than a specified threshold, then additional comparison algorithms will be run against the comparison pair to attempt to match them as belonging to a common entity.

In some embodiments, but not necessarily all embodiments, the collection of digital document comparison algorithms includes algorithms for determining whether comparison pair belong to the same entity on the basis of:
1. A person's name;
2. A person's email address;
3. A person's affiliated organization;
4. An email address for a person's known associate;
5. A person's network of known associates; and
6. An organization's name and location.

It is understood that other types of comparison algorithms may be utilized for matching objects within a mention group without departing from the scope of the claimed invention.

Person Name

The person name comparison algorithm, described below, determines whether a comparison pair of the person type "fuzzily" matches on the basis of last name, forename and initials. By executing this algorithm, the microprocessor stores several aScores and updates the comparison pair's cScore if the new cScore will be greater than the existing cScore.

First perform a check of the Person's last name to see if it is in the "problem name list" or if it is a "high frequency name." If so, then flag the group (which is derived from the last name). If not, calculate the mean and standard deviation for the frequency of the person mentions assigned to each group. Flag the groups that have frequencies of mentions (configurable by default is top 2 standard deviations).

Perform a pre-comparison operation of creating formal forename and formal initials attributes from the mention objects forename attribute. This is done by first converting Unicode text to ASCII text using a character replacement look-up table and then performing a substitution of nick names for formal names (example: substitute Robert for the occurrence of either Rob or Bob). If the formal forename is different from the mention forename then check both name values when performing the person name algorithm steps. If the formal name and mention name are the same, then only use the mention forename (and initials) when performing the comparisons in the algorithm steps.

Using the algorithm, the processor compares the comparison pair using the formal forename and initials values:
- If the comparison pair already has a cScore of 0 skip to the next comparison pair.
- If the two mentions are in the same author list or some other exclusive set defined in an electronic document schema then assign an algorithm score (aScore) of 0 (zero) and a confidence score (cScore) of 0 (zero).
- Else if the first initial is different assign an aScore of 0 (zero) and a cScore of 0 (zero).
- Else if the forename(s) are not initials and the length of the forename length is greater than 3 and the forename text is equal then assign an aScore of 10 and a cScore of 0.6. If the group is flagged, decrease the cScore to 0.5.
- Else if the length of the initials is equal and the initials' text is not equal then assign an aScore of 0 and a cScore of 0.
- Else if the length of the initials is greater than 1 and the initials are equal and the forename compatibility function returns false then assign an aScore of 2 and a cScore of 0.3. If the group is flagged decrease the cScore to 0.2.
- Else if either forename is an initial of length equal to 1 and forename compatibility function returns true then assign an aScore of 5 and a cScore of 0.5. If the group is flagged decrease the cScore to 0.4.
- Else if mention 1 forename has 2 or more spaces and mention 2 forename has 2 or more spaces and forename compatibility function returns true then assign an aScore of 9 and a cScore of 0.6. If the group is flagged then decrease the cScore to 0.5.
- Else if mention 1 forename has 2 or more spaces or mention 2 forename has 2 or more spaces and forename compatibility function returns true then assign an aScore of 8 and a cScore of 0.5. If the group is flagged then decrease the cScore to 0.4.
- Else if either forename is initials of length 2 and the forename compatibility function returns true then assign an aScore of 7 and a cScore of 0.5. If the group is flagged then decrease the cScore to 0.4.
- Else if the forename compatibility function returns true assign an aScore of 8 and a cScore of 0.6. If the group is flagged then decrease the cScore to 0.5
- Else assign an aScore of 2 and a cScore of 0.1.

The forename compatibility function looks at the text of two forenames and determines if the two text names are compatible. Note that forenames are sometimes only initials. Examples: J is compatible with John. JM is compatible with John, but JM is not compatible with John Joseph.

Person Email

The person email match comparison algorithm compares two person mention objects that have a value populated in their email attribute. Using this algorithm the processor determines whether the two email addresses are the same, and, if the emails are determined to be the same, the processor stores an aScore and updates the comparison pair's cScore if the new cScore will be greater than the existing cScore.

Since an email address is deemed a high certainty identifier this algorithm does not consider any of the person name algorithm aScores.
- If the comparison pair already has a cScore of 0 skip to the next comparison pair.
- If two mentions have the same email text then the processor stores an aScore of 1 and updates the comparison pairs' cScore to 1.
- If the email address text does not match then nothing is stored or updated. This is because not having the same email address does not prove two mentions do not belong to the same entity.

Person Affiliated Organization (Version 1)—Simple Compare

The person affiliated organization comparison algorithms examine a comparison pair where both objects have at least one affiliated organization mention object. Using the algorithm the processor determines whether there is a match based on the affiliated organization, and, if a positive fuzzy match is found, stores an aScore and updates the comparison pair's cScore if the new cScore will be greater than the existing cScore.

One example person affiliated organization comparison algorithm, called a "simple compare," works as follows.

Select all comparison pairs that have an affiliated organization mention. Compare each comparison pair's affiliated organization names and other attributes. Note that a given person mention object may be directly related to more than one organization mention object. The steps used for this comparison may include:
- The person name compare algorithm must have been previously run for this comparison pair.
- If the comparison pair already has a cScore of 0 skip to the next comparison pair
- Replace all acronyms using dictionary of organization acronyms
- Remove all low value words based on a configurable list (examples: a, the, in, etc.)
- Compare words in organization name
- If the number of words in one of the mentions is <=4 and the comparison yields 100% assign an aScore of 10.

If the comparison is <100% assign an aScore of 0.
If the comparison yields 70% match or better assign an aScore of 7-10 depending on percent match, else assign an aScore=0
If the organization name aScore=0 do not update the cScore and continue to the next comparison pair.
Compare the country values for the comparison pair, if available—if the country values match, then add an aScore for country=10 if the country values to not match, then assign a country aScore=0.
If country aScore=0 do not update the cScore and continue to the next comparison pair.
If organization name aScore=7 and forename aScore>=7 update the comparison pair cScore to the greater value (0.7 or the current value).
If organization name aScore=8 and forename aScore>=7 update the comparison pair cScore to the greater value (0.8 or the current value).
If organization name aScore>8 and forename aScore>=7 update the comparison pair cScore to the greater value (0.9 or the current value).
If the group is flagged:
If organization name aScore>=9 and forename aScore>=9 update the comparison pair cScore to the greater value (0.8 or the current value).
If organization name aScore>=7 and forename aScore>=7 update the comparison pair cScore to the greater value (0.6 or the current value).
Else do not update the comparison pair cScore Person Affiliated Organization Match (Version 2)—Organization Dictionaries Alternatively, embodiments of the present invention may use a different person affiliated organization comparison algorithm, referred to as the "dictionary compare." The difference between the "simple compare" person organization match algorithm and the "dictionary compare" person organization match algorithm is that the dictionary compare performs a fuzzy compare of each organization text in the affiliated organization mention object to a standardized organization name stored in a dictionary of organization objects. This increases the consistency of the comparison and also allows the organization mentioned in the mention to potentially match more than one organization in the dictionary. Then the two resulting dictionary lookup(s) are compared using their unique identifier. If the organization is not found in the dictionary it will be written out to an exception report and later researched and added to the dictionary by a QA operator.

The dictionary compare person affiliated organization comparison algorithm works as follows.

Select all comparison pairs where both objects have at least one affiliated organization mention objects. Compare the organization mention objects names and other attributes. The steps use for this comparison
  The person name compare algorithm must have been previously run for this comparison pair.
  If the comparison pair already has a cScore of 0 skip to the next comparison pair
  Replace all acronyms using dictionary of organization acronyms
  Fuzzy Compare each organization name to organizations in dictionary (compare name and other attributes).
  Take the list of dictionary matches for each mention that scores over an 80% certainty.
  If any dictionary organizations for each mention match exactly assign an aScore of 10
  If dictionary organizations for each mention match with in the same org hierarchy assign an aScore of 8
  If organization aScore<8 assign an aScore of 0
  If aScore=0 do not update cScore and proceed to next comparison pair comparison
  If organization name aScore=10 and forename aScore>=7 update the comparison pair cScore to the greater value (0.9 or the current value).
  If organization name aScore=8 and forename aScore>=7 update the comparison pair cScore to the greater value (0.8 or the current value).
  If the group is flagged:
  If organization name aScore>=8 and forename aScore>=9 update the comparison pair cScore to the greater value (0.8 or the current value).
  If organization name aScore>=8 and forename aScore>=7 update the comparison pair cScore to the greater value (0.6 or the current value).
  Else do not update the comparison pair cScore Coauthor (Known Associate) Email The known associate email match algorithm compares two person mention objects where both objects have a relation to another person mention object (known associate) and that object has is at least one email address specified. If a positive fuzzy match is found, the processor stores an aScore and updates the comparison pair's cScore if the new cScore will be greater than the existing cScore.
  The person name compare algorithm must have been previously run for this comparison pair.
  If the comparison pair already has a cScore of 0 skip to the next comparison pair.
  If the two associates' email address are NOT equal for the comparison pair do not store or update anything.
  If the two associates' email addresses are equal for the comparison pair, store an aScore of 1 for this algorithm.
    If the group is flagged and If the forename algorithm for the comparison pair has an aScore>=7, then update the comparison pair's cScore to 0.6 only if the new cScore will be greater than the existing cScore.
    If the forename algorithm for the comparison pair has an aScore >=7 update the comparison pair's cScore to 0.8 only if the new cScore will be greater than the existing cScore.
    If the group is flagged and If the forename algorithm for the comparison pair has an aScore>=5 update the comparison pair's cScore to 0.5 only if the new cScore will be greater than the existing cScore.
    If the forename algorithm for the comparison pair has an aScore >=5 update the comparison pair's cScore to 0.6 only if the new cScore will be greater than the existing cScore.

Person Network (Known Associates)

The person network comparison algorithm evaluates a comparison pair where both objects have relations to one or more person mention objects. An example of this situation can be seen when two authors of different publications have compatible names and the authors being compared both have co-authors for the publication. Using this algorithm, the processor performs a fuzzy comparison of the two lists of known associates. If the fuzzy comparison yields a satisfactory match, the processor stores an aScore and updates the comparison pair's cScore if the new cScore will be greater than the existing cScore.
  The person name compare algorithm must have been previously run for this comparison pair.
  If the comparison pair already has a cScore of 0 skip to the next comparison pair Compare each known associate's last name and forename in the first object of the pair to each known associate's last name and forename in the second object of the pair using the Person Name comparison algorithm (from above). If the comparison of the known associates names yields an aScore of 5 or greater add that aScore to then Network Comparison Algorithm aScore.

If the total network comparison algorithm aScore exceeds 30 stop comparing the known associated names.

Then:

If the mention group is not flagged (not a problem or high frequency last name) and the total network comparison algorithm aScore>=21 and the Person Name aScore>=7 then update the comparison pair cScore to the greater value (0.9 or the current value).

If the mention group is not flagged (not a problem last name) and the total network comparison algorithm aScore>=17 and the Person Name aScore>=5 then update the comparison pair cScore to the greater value (0.8 or the current value).

If the mention group is not flagged and the total network comparison algorithm aScore>=13 and the Person Name aScore>=7 then update the comparison pair cScore to the greater value (0.8 or the current value).

If the mention group is not flagged (not a problem or high frequency last name) and the total network comparison algorithm aScore>=12 and the Person Name aScore>=8 then update the comparison pair cScore to the greater value (0.8 or the current value).

If the mention group is not flagged and the length of the known associates list is 3 or less and the total network comparison algorithm aScore>=7 and the Person Name aScore>=8 then update the comparison pair cScore to the greater value (0.9 or the current value).

If the mention group is flagged and the total network comparison algorithm aScore>=25 and the Person Name aScore>=5 then update the comparison pair cScore to the greater value (0.8 or the current value).

If the mention group is flagged and the total network comparison algorithm aScore>=17 and the Person Name aScore>=7 then update the comparison pair cScore to the greater value (0.8 or the current value).

If the mention group is flagged and the length of the known associates list is 5 or less and the total network comparison algorithm aScore>=15 and the Person Name aScore>=8 then update the comparison pair cScore to the greater value (0.8 or the current value).

If the mention group is flagged and the length of the known associates list is 4 or less and the total network comparison algorithm aScore>=14 and the Person Name aScore>=7 then update the comparison pair cScore to the greater value (0.8 or the current value).

If the mention group is flagged and the length of the known associates list is 4 or less and the total network comparison algorithm aScore>=12 and the Person Name aScore>=8 then update the comparison pair cScore to the greater value (0.8 or the current value).

Else do not update the cScore because not generating a sufficient aScore does not preclude this comparison pair from being the same entity Organization (Used to Create Organization Entities)

The organization comparison algorithm is used when both mention objects are of the type organization. In this case the objective is to determine if the two organization mention objects are not the same, the same, or a related organization (example: a department within an organization or a wholly owned subsidiary).

Replace all acronyms using dictionary of organization acronyms

Fuzzy Compare each organization mention object to a set of maintained organization entity objects (compare name and other attributes).

For the comparison pair that yields the best score with over an 80% certainty, update the organization mention object's organization entity id attribute to the matched organization entity's id.

If a match cannot be found with at least an 80% level of certainty write out the organization mention objects' details to an exception report for later quality assurance processing.

Illustrative "Before and after" Examples

The diagrams in FIGS. 6 and 7 illustrate, by way of example, how data representing ambiguous person mentions and relationship information in a database would be restructured, according to embodiments of the present invention, to create data representing disambiguated person entities and relations. The diagram in FIG. 6 shows the mention objects for four persons with their related organizations before the entity creation module executes, while the diagram in FIG. 7 shows two disambiguated entity objects with their respective sets of mention objects and organization relations after the entity creation module is executed. As illustrated in FIG. 6, before any clustering has been performed, the data in the database indicate that there are four mention objects potentially related to as many as four different person entities, or entity objects (i.e., John Smith at ACME, Inc., John Smith at UCLA, J. M. Smith at UCLA, and John Smith at Cogs, Inc.). After the clustering is performed, and as shown in FIG. 7, two of the mention objects (John Smith at Acme, and John Smith at UCLA) have been clustered together and associated with person entity 101, while the other two mention objects (J. M. Smith at UCLA and John Smith at Cogs, Inc.) have been clustered together and associated with person entity object 102. The clustering comprising the person entity object 101 has a confidence score (or cScore) of 0.8, which means this is a high confidence clustering. The person entity object 102 has a score of 0.6, which means this is a moderate confidence clustering.

Figure 9:
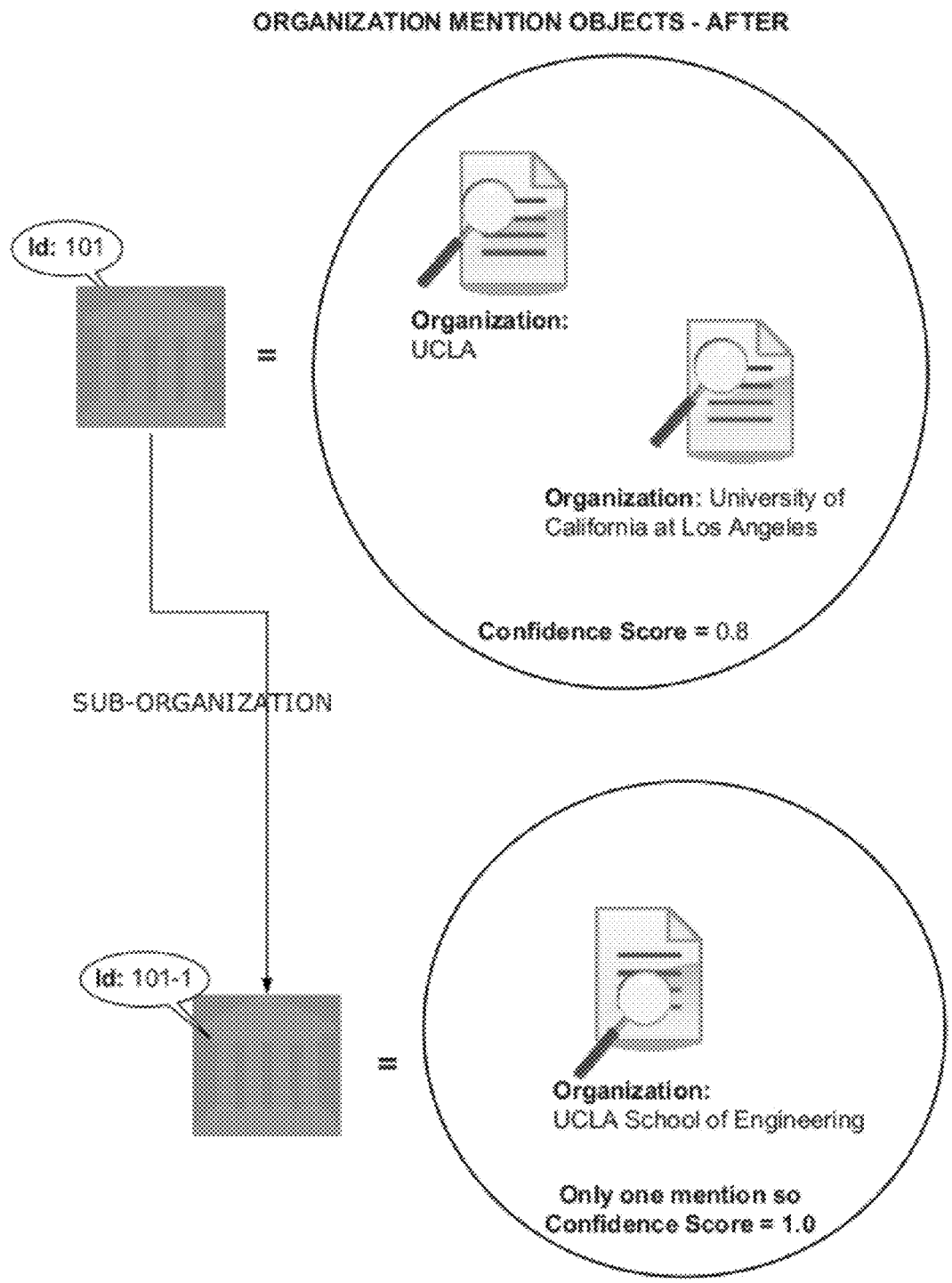

The diagrams in FIGS. 8 and 9 illustrate, by way of example, how data representing ambiguous organization mention information in a database would be restructured, according to embodiments of the present invention, to create data representing disambiguated organization entity mentions and relations. The diagram in FIG. 8 shows the mention objects for three organizations before the entity creation module executes, while the diagram in FIG. 9 shows two disambiguated entity mentions with their respective sets of mention objects after the entity creation module is executed. As illustrated in FIG. 8, before any clustering has been performed, the data in the database indicate that there are three mention objects potentially related to as many as three different organization entities. After the clustering is performed, and as shown in FIG. 9, two of the mention objects (UCLA and University of California at Los Angeles) have been clustered together and associated with organization entity 101, while the other mention object (UCLA School of Engineering) is a singleton and hence does not require clustering. It is associated with organization entity object 101-1. The entity creation module also created a new SUB-ORGANIZATION relation between these two organizations. The entity object 101 organization cluster has a confidence score (or cScore) of 0.8, which means this is a high confidence cluster. The entity object 101-1 organization cluster is a singleton and hence receives the highest confidence score of 1.0.

Through the methods and systems described and claimed herein, the invention automatically extracts from the corpus of electronic documents mentions about entities (e.g., references to people, organizations or places), parses the entity mentions into "mention objects," and executes a series of grouping, comparison and hierarchical fuzzy object clustering algorithms to cluster together in an electronic database all of the mention objects referring to the same entity and all of the mention objects (e.g. "people") associated with each other by a relationship (e.g., "co-authors" or "family members"). The resulting electronic database of disambiguated entity mentions and relations, which may comprise, for example, an XML document, a relational database or hierarchical database, is structured to permit useful recordation, access, review and display of all of the mentions and relations associated with a particular entity or collection of entities.

Although the exemplary embodiments, uses and advantages of the invention have been disclosed above with a certain degree of particularity, it will be apparent to those skilled in the art upon consideration of this specification and practice of the invention as disclosed herein that alterations and modifications can be made without departing from the spirit or the scope of the invention, which are intended to be limited only by the following claims and equivalents thereof.

What is claimed is:

1. A method for creating an electronic database of disambiguated entity mentions from a corpus of electronic documents using a microprocessor, the method comprising:
   (a) executing on the microprocessor a data harvesting module to automatically extract entity mentions from the electronic documents in the corpus and parse the entity mentions into mention objects;
   (b) executing on the microprocessor a mention group creation module to create one or more mention groups by automatically grouping the mention objects together according to a distinguishing attribute common to a given class of mention objects;
   (c) selecting a mention group from the one or more mention groups for comparison processing;
   (d) executing on the microprocessor a collection of comparison modules that automatically (i) compares every mention object in the selected mention group with every other mention object in the selected mention group to produce a collection of comparison algorithm scores for every pair of mention objects in the selected mention group, and (ii) generates an overall confidence score for every pair of mention objects in the selected mention group based on the collection of comparison algorithm scores for said every pair of mention objects;
   (e) executing on the microprocessor an entity object creation module to create one or more new entity objects for the selected mention group by automatically (i) grouping together mention objects with other mention objects, based on the confidence scores of each pair of mention objects and a specified confidence threshold, wherein pairs of mention objects having a confidence score greater than or equal to the specified threshold are assigned to the same new entity object, and (ii) merging previously-created entity objects with other previously-created entity objects, based on the confidence scores of each pair of entity objects, and a specified confidence threshold, wherein pairs of entity objects having a confidence score greater than or equal to the specified threshold are assigned to the same new entity object;
   (f) storing said one or more new entity objects in the electronic database of disambiguated entity mentions; and
   (g) repeating steps (c) through (f) above until all of the one or more mention groups have been comparison processed.

2. The method of claim 1, further comprising:
   executing the data harvesting module on the microprocessor to cause the microprocessor to automatically identify a relation between two or more mention objects based on the structure of the electronic document from which said two or more mention objects were extracted; and
   storing the identified relation in the electronic database as a relation object.

3. The method of claim 1, further comprising executing program instructions on the microprocessor to cause the microprocessor to normalize the distinguishing common attribute for each mention object in the given class according to a set of normalization rules prior to grouping the mention objects together based on the distinguishing common attribute.

4. The method of claim 3, further comprising executing program instructions on the microprocessor to cause the microprocessor to normalize the distinguishing common attribute for each mention object in the given class by performing ASCII letter substitution on Unicode characters.

5. The method of claim 1, further comprising executing program instructions on the microprocessor to cause the microprocessor to assign a mention object having a name that is slightly misspelled to the same mention group as another mention object having a correctly-spelled version of said name.

6. The method of claim 1, wherein executing the collection of comparison modules includes executing a set of program instructions on the microprocessor that cause the microprocessor to determine whether a match exists between two or more mention objects in the selected mention group.

7. The method of claim 6, wherein executing the set of program instructions on the microprocessor causes the microprocessor to determine whether the match exists based on at least one of:
   a personal name attribute,
   an organization name attribute,
   an email address attribute, and
   an affiliated organization attribute.

8. The method of claim 7, wherein the set of program instructions are further configured to cause the microprocessor to determine whether the match exists according to a set of fuzzy logic object matching rules.

9. The method of claim 1, further comprising executing the collection of comparison modules on the microprocessor so as to automatically (i) compare every entity object in the selected mention group with every other entity object in the selected mention group to produce a collection of comparison algorithm scores for every pair of entity objects in the selected mention group, and (ii) generate an overall confidence score for every pair of entity objects in the selected mention group based on the collection of comparison algorithm scores for said every pair of entity objects.

10. The method of claim 1, further comprising:
    establishing a communication channel to the corpus of electronic documents; and
    extracting the entity mentions from the corpus of electronic documents via the communications channel.

11. The method of claim 1, wherein:
    the entity mentions in the corpus of electronic documents are arranged according to a predefined document structure; and
    the data harvesting module includes program instructions that cause the microprocessor to the extract entity mentions from the corpus of electronic documents in accordance with the predefined document structure.

12. The method of claim 11, further comprising:
storing in a memory storage area accessible to the microprocessor a document schema comprising information representing the predefined document structure for the electronic documents in the corpus; and
causing the microprocessor to extract the entity mentions from the corpus electronic documents according to the schema.

13. The method of claim 11, further comprising:
storing in a memory storage area accessible to the microprocessor a collection of site navigation and extraction rules comprising information representing the predefined document structure for the corpus of electronic documents; and
executing on the microprocessor a web spider program configured to cause the microprocessor to traverse the corpus of electronic documents and extract the entity mentions in accordance with the collection of site navigation and extraction rules.

14. The method of claim 1, wherein:
the entity mentions in the corpus of electronic documents are not arranged according to a predefined document structure; and
the data harvesting module comprises a natural language processor that, when executed by the microprocessor, causes the microprocessor to extract and parse the entity mentions in the electronic documents in accordance with a set of natural language rules.

15. The method of claim 1, wherein:
the electronic documents in the corpus comprise one or more XML documents; and
the data harvesting module comprises file transfer tool that, when executed by the microprocessor, causes the microprocessor to transfer the content of the electronic documents to a reference database prior to parsing the contents into mention objects.

16. The method of claim 1, wherein:
the electronic documents in the corpus comprise one or more records of an electronic database; and
the data harvesting module comprises a database query tool that, when executed by the microprocessor, causes the microprocessor to extract and parse the entity mentions from said one or more records of the electronic database.

17. The method of claim 1, further comprising storing source information from the electronic documents in a document reference database.

18. The method of claim 1, wherein the corpus of electronic documents comprises an electronic database of publications.

19. The method of claim 1, wherein the corpus of electronic documents comprises an electronic database of patents.

20. The method of claim 1, wherein the corpus of electronic documents comprises an electronic database of articles.

21. The method of claim 1, wherein the corpus of electronic documents comprises a website.

22. An apparatus for creating an electronic database of disambiguated entity mentions from a corpus of electronic documents, comprising:
a microprocessor;
a data harvesting module comprising program instructions that, when executed by the microprocessor, will cause the microprocessor to automatically extract entity mentions from the corpus of electronic documents and parse the entity mentions to produce one or more mention objects;
a mention group creation module comprising program instructions that, when executed by microprocessor, will cause the microprocessor to automatically create one or more mention groups by automatically grouping mention objects together according to a distinguishing attribute common to a given class of mention objects;
a collection of comparison modules having program instructions that, when executed by microprocessor, will cause the microprocessor to automatically (i) compare every mention object in a selected mention group with every other mention object in the selected mention group to produce a collection of comparison algorithm scores for every pair of mention objects in the selected mention group, and (ii) generate an overall confidence score for every pair of mention objects in the selected mention group based on the collection of comparison algorithm scores for said every pair; and
an entity object creation module having program instructions that, when executed by microprocessor, will cause the microprocessor to automatically create in the electronic database one or more new entity objects for the selected mention group by automatically
(i) grouping together mention objects with other mention objects, based on the confidence scores of each pair of mention objects and a specified confidence threshold, wherein pairs of mention objects having a confidence score greater than or equal to the specified threshold are assigned to the same new entity object, and
(ii) merging previously-created entity objects with other previously-created entity objects, based on the confidence scores of each pair of entity objects, and a specified confidence threshold, wherein pairs of entity objects having a confidence score greater than or equal to the specified threshold are assigned to the same new entity object.

23. The apparatus of claim 22, wherein:
the data harvesting module further comprises program instructions configured to cause the microprocessor to automatically identify relations between the mention objects and store the identified relations in the electronic database as relation objects.

24. The apparatus of claim 22, further comprising a communication channel to the corpus of electronic documents.

25. The apparatus of claim 22, wherein the mention group creation module normalizes the distinguishing common attribute for each mention object in the given class according to a set of normalization rules prior to grouping the mention objects together based on the distinguishing common attribute.

26. The apparatus of claim 25, wherein the mention group creation module normalizes the distinguishing common attribute for each mention object in the given class by performing ASCII letter substitution on Unicode characters.

27. The apparatus of claim 22, wherein the mention group creation module includes program instructions that cause the microprocessor to assign a mention object having a slightly misspelled name to the same mention group as a mention object having a correctly-spelled version of said name.

28. The apparatus of claim 22, wherein the collection of comparison modules includes program instructions that cause the microprocessor to determine whether a match exists between two or more mention objects in the selected mention group based on at least one of:
a personal name attribute,
an organization name attribute, an email address attribute, and
an affiliated organization attribute.

29. The apparatus of claim 28, wherein the program instructions that cause the microprocessor to determine whether the match exists includes a set of fuzzy logic object matching rules that, when processed by the microprocessor, will cause the microprocessor to determine a relative degree to which the match exists between the two or more mention objects.

30. The apparatus of claim 28, wherein the microprocessor will produce a comparison algorithm score for the two or more mention objects based on the relative degree to which the match exists between said two or more mention objects.

31. The apparatus of claim 22, wherein the collection of comparison modules includes program instructions that, when executed by microprocessor, will cause the microprocessor to automatically (i) compare every entity object in a selected mention group with every other entity object in the selected mention group to produce a collection of comparison algorithm scores for every pair of entity objects in the selected mention group, and (ii) generate an overall confidence score for every pair of entity objects in the selected mention group based on the collection of comparison algorithm scores for said every pair of entity objects.

32. The apparatus of claim 22, wherein:
the entity mentions in the corpus of the electronic documents are arranged according to a predefined document structure; and
the data harvesting module includes program instructions that cause the microprocessor to extract and parse the entity mentions in accordance with the predefined document structure.

33. The apparatus of claim 32, further comprising:
a document schema comprising information representing the predefined document structure for the electronic documents in the corpus; and
the data harvesting module includes program instructions to cause the microprocessor to read the document schema prior to extracting the entity mentions from the corpus of electronic documents.

34. The apparatus of claim 32, further comprising:
a collection of site navigation and extraction rules comprising information representing the predefined document structure for the electronic documents in the corpus; and
a web spider program configured to cause the microprocessor to traverse the electronic documents in the corpus and extract the entity mentions in accordance with the collection of site navigation and extraction rules.

35. The apparatus of claim 22, wherein:
the entity mentions of the electronic documents in the corpus are not arranged according to a predefined document structure; and
the data harvesting module comprises a natural language processor that, when executed by the microprocessor, causes the microprocessor to extract and parse the entity mentions in accordance with a set of natural language rules.

36. The apparatus of claim 22, wherein:
the electronic documents in the corpus comprise one or more XML documents; and
the data harvesting module comprises file transfer tool that, when executed by the microprocessor, causes the microprocessor to transfer the content of the electronic documents to a reference database prior to parsing the contents into the mention objects.

37. The apparatus of claim 22, wherein:
the electronic documents in the corpus comprise one or more records of an electronic database; and
the data harvesting module comprises a database query tool that, when executed by the microprocessor, causes the microprocessor to extract and parse the entity mentions from said one or more records of the electronic database.

38. The apparatus of claim 22, further comprising a document reference database for storing source information about the extracted and parsed entity mentions.

39. The apparatus of claim 22, wherein the corpus of electronic documents comprises an electronic database of publications.

40. The apparatus of claim 22, wherein the corpus of electronic documents comprises an electronic database of patents.

41. The apparatus of claim 22, wherein the corpus of electronic documents comprises an electronic database of articles.

42. The apparatus of claim 22, wherein the corpus of electronic documents comprises a website.

43. An apparatus for augmenting an electronic database of disambiguated entity mentions, comprising:
a microprocessor;
a document information database having a set of records that uniquely identify each electronic document in the corpus that was used to create the electronic database of disambiguated mention objects;
a data harvesting module comprising program instructions that cause the microprocessor to automatically (i) read and extract entity mentions from each new electronic document based on the set of records uniquely identifying the used electronic documents, (ii) parse the entity mentions of each new electronic document into a plurality of new mention objects in accordance with the predefined structure, and (iii) store the plurality of new mention objects in a mention object database;
a mention group creation module that retrieves the plurality of new mention objects from the mention object database and groups them according to a distinguishing attribute common to a given class of mention objects, by first determining whether the each mention object should be associated with an existing mention group or a new mention group;
a set of comparison rules;
a collection of comparison algorithms that compares each new mention object in a selected mention group with every other new mention object in the selected mention group to produce a collection of algorithm scores for each comparison pair, and then produces a confidence score for each comparison pair based on the collection of algorithm scores for that comparison pair; and
an entity object creation module having program instructions that cause the microprocessor to automatically create and store in the electronic database of disambiguated entity mentions one or more new entity objects for the selected mention group by automatically
(i) grouping together mention objects with other mention objects, based on the confidence scores of each pair of mention objects and a specified confidence threshold, wherein pairs of mention objects having a confidence score greater than or equal to the specified threshold are assigned to the same new entity object, and
(ii) merging previously-created entity objects with other previously-created entity objects, based on the confidence scores of each pair of entity objects, and a specified confidence threshold, wherein pairs of entity objects having a confidence score greater than or equal to the specified threshold are assigned to the same new entity object.

44. A non-transitory computer-readable storage medium with an executable program for creating an electronic database of disambiguated entity mentions from a corpus of electronic documents stored thereon, wherein the executable program comprises instructions to cause a microprocessor to:
  (a) automatically extract entity mentions from the corpus of electronic documents and parse the entity mentions into mention objects;
  (b) create one or more mention groups by automatically grouping the mention objects together according to a distinguishing attribute common to a given class of mention objects;
  (c) select a mention group from the one or more mention groups for comparison processing;
  (d) automatically compare every mention object in the selected mention group with every other mention object in the selected mention group to produce a collection of comparison algorithm scores for every pair of mention objects in the selected mention group;
  (e) generate an overall confidence score for every pair of mention objects in the selected mention group based on the collection of comparison algorithm scores for said every pair;
  (f) create in the electronic database of disambiguated entity mentions one or more new entity objects for the selected mention group by automatically (i) grouping together mention objects with other mention objects, based on the confidence scores of each pair of mention objects and a specified confidence threshold, wherein pairs of mention objects having a confidence score greater than or equal to the specified threshold are assigned to the same new entity object, and (ii) merging previously-created entity objects with other previously-created entity objects, based on the confidence scores of each pair of entity objects, and a specified confidence threshold, wherein pairs of entity objects having a confidence score greater than or equal to the specified threshold are assigned to the same new entity object;
  (g) repeat steps (c) through (f) above until all of the one or more mention groups have been comparison processed.

45. The computer-readable storage medium of claim 44, wherein the executable program further includes program instructions to cause the microprocessor to automatically identify relations between the mention objects; and store the identified relations in a relation object database.

46. The computer-readable storage medium of claim 44, wherein the executable program further includes program instructions to cause the microprocessor to normalize the distinguishing common attribute for each mention object in the given class according to a set of normalization rules prior to grouping the mention objects together based on the distinguishing common attribute.

47. The computer-readable storage medium of claim 44, wherein the executable program further includes program instructions to cause the microprocessor to normalize the distinguishing common attribute for each mention object in the given class by performing ASCII letter substitution on Unicode characters.

48. The computer-readable storage medium of claim 44, wherein the executable program further includes program instructions to cause the microprocessor to assign a mention object having a name that is slightly misspelled to the same mention group as another mention object having a correctly-spelled version of said name.

49. The computer-readable storage medium of claim 44, wherein the executable program further includes program instructions to cause the microprocessor to determine whether a match exists between two or more mention objects in the selected mention group.

50. The computer-readable storage medium of claim 44, wherein the executable program further includes program instructions to cause the microprocessor to determine whether the match exists based on at least one of:
  a personal name attribute,
  an organization name attribute,
  an email address attribute, and
  an affiliated organization attribute.

51. The computer-readable storage medium of claim 44, wherein the executable program further includes program instructions configured to cause the microprocessor to determine whether the match exists according to a set of fuzzy logic object matching rules.

52. The computer-readable storage medium of claim 44, wherein the executable program further includes program instructions to cause the microprocessor to:
  automatically compare every entity object in the selected mention group with every other entity object in the selected mention group to produce a collection of comparison algorithm scores for every pair of entity objects in the selected mention group; and
  generate an overall confidence score for every pair of entity objects in the selected mention group based on the collection of comparison algorithm scores for said every pair of entity objects.

* * * * *

UNITED STATES PATENT AND TRADEMARK OFFICE
CERTIFICATE OF CORRECTION

PATENT NO. : 8,370,328 B2  
APPLICATION NO. : 13/206492  
DATED : February 5, 2013  
INVENTOR(S) : Michael A. Woytowitz and Marshall Wells Hawks Page 1 of 1

It is certified that error appears in the above-identified patent and that said Letters Patent is hereby corrected as shown below:

In the Specification

Column 11, Line 7 - "Pauline" should read --Emily--.

Column 20, Line 56 - "Hierarchal" should read --Hierarchical--.

Column 28, Line 14 - "after" should read --After--.

Signed and Sealed this  
Thirteenth Day of August, 2013

Teresa Stanek Rea  
*Acting Director of the United States Patent and Trademark Office*